(12) United States Patent
Abramson et al.

(10) Patent No.: US 7,787,169 B2
(45) Date of Patent: Aug. 31, 2010

(54) ELECTRO-OPTIC DISPLAYS, AND METHODS FOR DRIVING SAME

(75) Inventors: Justin J. Abramson, Wayland, MA (US); Karl R. Amundson, Cambridge, MA (US); Guy M. Danner, Somerville, MA (US); Gregg M. Duthaler, Needham, MA (US); Holly G. Gates, Somerville, MA (US); Charles H. Honeyman, Roslindale, MA (US); Ara N. Knaian, Newton, MA (US); Ian D. Morrison, Acton, MA (US); Steven J. O'Neil, Pembroke, MA (US); Richard J. Paolini, Jr., Arlington, MA (US); Anthony Edward Pullen, Belmont, MA (US); Jianna Wang, Grafton, MA (US); Jonathan L. Zalesky, Watertown, MA (US); Robert W. Zehner, Arlington, MA (US); John E. Cronin, Williston, VT (US)

(73) Assignee: E Ink Corporation, Cambridge, MA (US)

( * ) Notice: Subject to any disclaimer, the term of this patent is extended or adjusted under 35 U.S.C. 154(b) by 628 days.

(21) Appl. No.: 10/907,171

(22) Filed: Mar. 23, 2005

(65) Prior Publication Data
US 2005/0152018 A1    Jul. 14, 2005

Related U.S. Application Data

(62) Division of application No. 10/249,128, filed on Mar. 18, 2003, now Pat. No. 6,950,220.

(60) Provisional application No. 60/319,281, filed on May 31, 2002, provisional application No. 60/365,369, filed on Mar. 18, 2002, provisional application No. 60/365,385, filed on Mar. 18, 2002, provisional application No. 60/319,279, filed on May 31, 2002, provisional application No. 60/319,280, filed on May 31, 2002, provisional application No. 60/365,368, filed on Mar. 18, 2002, provisional application No. 60/319,438, filed on Jul. 31, 2002.

(51) Int. Cl.
*G02F 1/153* (2006.01)
(52) U.S. Cl. .................. 359/267; 359/296; 359/264
(58) Field of Classification Search ......... 359/264–277, 359/252–255, 296, 240–242, 245, 452, 321–322, 359/307, 315; 252/583–584, 586; 348/11, 348/105, 87–88, 84, 48–49, 102, 107–108
See application file for complete search history.

(56) References Cited

U.S. PATENT DOCUMENTS 3,668,106 A    6/1972    Ota ............................ 358/305

(Continued)

FOREIGN PATENT DOCUMENTS

EP    1 024 394 A1    8/2000

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Jessica T Stultz
(74) *Attorney, Agent, or Firm*—David J. Cole

(57) ABSTRACT

The invention relates to electro-optic displays and methods for driving such displays. The invention provides (i) electrochromic displays with solid charge transport layers; (ii) apparatus and methods for improving the contrast and reducing the cost of electrochromic displays; (iii) apparatus and methods for sealing electrochromic displays from the outside environment and preventing ingress of contaminants into such a display; and (iv) methods for adjusting the driving of electro-optic displays to allow for environmental and operating parameters.

9 Claims, 21 Drawing Sheets

U.S. PATENT DOCUMENTS

| | | | |
|---|---|---|---|
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 3,932,024 A | 1/1976 | Yaguchi et al. | 349/113 |
| 4,088,395 A | 5/1978 | Giglia | 359/269 |
| 4,231,641 A | 11/1980 | Randin | 359/274 |
| 4,280,754 A | 7/1981 | Yano et al. | 359/267 |
| 4,418,346 A | 11/1983 | Batchelder | 340/787 |
| 4,448,493 A | 5/1984 | Matsudaira et al. | 359/268 |
| 4,502,934 A | 3/1985 | Gazard et al. | 204/242 |
| 4,640,583 A | 2/1987 | Hoshikawa et al. | 349/153 |
| 5,138,472 A | 8/1992 | Jones et al. | 344/146 |
| 5,518,792 A | 5/1996 | Matsuda et al. | 428/216 |
| 5,639,914 A | 6/1997 | Tomiyama et al. | 564/309 |
| 5,724,187 A | 3/1998 | Varaprasad et al. | 359/608 |
| 5,745,094 A | 4/1998 | Gordon, II et al. | 345/107 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,872,552 A | 2/1999 | Gordon, II et al. | 345/107 |
| 5,892,504 A | 4/1999 | Knapp | 345/204 |
| 5,930,026 A | 7/1999 | Jacobson et al. | 359/256 |
| 5,961,804 A | 10/1999 | Jacobson et al. | 204/606 |
| 6,017,584 A | 1/2000 | Albert et al. | 427/313.3 |
| 6,054,071 A | 4/2000 | Mikkelsen, Jr. | 264/1.36 |
| 6,055,091 A | 4/2000 | Sheridon et al. | 359/296 |
| 6,067,184 A | 5/2000 | Bonhote et al. | 359/265 |
| 6,067,185 A | 5/2000 | Albert et al. | 359/296 |
| 6,097,531 A | 8/2000 | Sheridon | 359/296 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,144,361 A | 11/2000 | Gordon, II et al. | 345/107 |
| 6,147,791 A | 11/2000 | Sheridon | 359/296 |
| 6,172,798 B1 | 1/2001 | Albert et al. | 359/296 |
| 6,177,921 B1 | 1/2001 | Comiskey et al. | 345/107 |
| 6,184,856 B1 | 2/2001 | Gordon, II et al. | 359/296 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,266,177 B1 | 7/2001 | Allemand et al. | 359/265 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,370,019 B1 | 4/2002 | Matthies et al. | 361/681 |
| 6,376,828 B1 | 4/2002 | Comiskey | 250/216 |
| 6,377,237 B1 * | 4/2002 | Sojourner | 345/102 |
| 6,377,387 B1 | 4/2002 | Duthaler et al. | 359/296 |
| 6,392,785 B1 | 5/2002 | Albert et al. | 359/296 |
| 6,392,786 B1 | 5/2002 | Albert | 359/296 |
| 6,413,790 B1 | 7/2002 | Duthaler et al. | 438/21 |
| 6,422,687 B1 | 7/2002 | Jacobson | 347/55 |
| 6,445,374 B2 | 9/2002 | Albert et al. | 345/107 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,480,182 B2 | 11/2002 | Turner et al. | 345/107 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,512,354 B2 | 1/2003 | Jacobson et al. | 324/71.1 |
| 6,515,649 B1 | 2/2003 | Albert et al. | 345/107 |
| 6,518,949 B2 | 2/2003 | Drzaic | 345/107 |
| 6,521,489 B2 | 2/2003 | Duthaler et al. | 438/149 |
| 6,531,997 B1 | 3/2003 | Gates et al. | 345/107 |
| 6,535,197 B1 | 3/2003 | Comiskey et al. | 345/107 |
| 6,538,801 B2 | 3/2003 | Jacobson et al. | 359/296 |
| 6,545,291 B1 | 4/2003 | Amundson et al. | 257/40 |
| 6,580,545 B2 | 6/2003 | Morrison et al. | 359/265 |
| 6,639,578 B1 | 10/2003 | Comiskey et al. | 345/107 |
| 6,652,075 B2 | 11/2003 | Jacobson | 347/55 |
| 6,657,772 B2 | 12/2003 | Loxley | 359/296 |
| 6,664,944 B1 | 12/2003 | Albert et al. | 345/107 |
| 6,665,107 B2 * | 12/2003 | Forgette et al. | 359/267 |
| D485,294 S | 1/2004 | Albert | D18/26 |
| 6,672,921 B1 | 1/2004 | Liang et al. | 445/24 |
| 6,680,725 B1 | 1/2004 | Jacobson | 345/107 |
| 6,683,333 B2 | 1/2004 | Kazlas et al. | 257/197 |
| 6,693,620 B1 | 2/2004 | Herb et al. | 345/107 |
| 6,704,133 B2 | 3/2004 | Gates et al. | 359/296 |
| 6,710,540 B1 | 3/2004 | Albert et al. | 313/498 |
| 6,714,334 B2 * | 3/2004 | Tonar | 359/265 |
| 6,721,083 B2 | 4/2004 | Jacobson et al. | 359/296 |
| 6,724,519 B1 | 4/2004 | Comiskey et al. | 359/296 |
| 6,727,881 B1 | 4/2004 | Albert et al. | 345/107 |
| 6,738,050 B2 | 5/2004 | Comiskey et al. | 345/173 |
| 6,741,386 B2 * | 5/2004 | Minami | 359/296 |
| 6,750,473 B2 | 6/2004 | Amundson et al. | 257/40 |
| 6,751,007 B2 * | 6/2004 | Liang et al. | 359/296 |
| 6,753,999 B2 | 6/2004 | Zehner et al. | 359/296 |
| 6,774,883 B1 * | 8/2004 | Muhlemann | 345/101 |
| 6,788,449 B2 | 9/2004 | Liang et al. | 359/296 |
| 6,804,037 B1 * | 10/2004 | Nito et al. | 359/253 |
| 6,816,147 B2 | 11/2004 | Albert | 345/107 |
| 6,819,471 B2 | 11/2004 | Amundson et al. | 359/296 |
| 6,822,782 B2 | 11/2004 | Honeyman et al. | 359/296 |
| 6,825,068 B2 | 11/2004 | Denis et al. | 438/149 |
| 6,825,829 B1 | 11/2004 | Albert et al. | 345/107 |
| 6,825,970 B2 | 11/2004 | Goenaga et al. | 359/296 |
| 6,831,769 B2 | 12/2004 | Holman et al. | 359/296 |
| 6,839,158 B2 | 1/2005 | Albert et al. | 359/296 |
| 6,842,167 B2 | 1/2005 | Albert et al. | 345/107 |
| 6,842,657 B1 | 1/2005 | Drzaic et al. | 700/120 |
| 6,864,875 B2 | 3/2005 | Drzaic et al. | 345/107 |
| 6,865,010 B2 | 3/2005 | Duthaler et al. | 359/296 |
| 6,866,760 B2 | 3/2005 | Paolini, Jr. et al. | 204/478 |
| 6,870,661 B2 | 3/2005 | Pullen et al. | 359/296 |
| 2002/0060321 A1 | 5/2002 | Kazlas et al. | 257/66 |
| 2002/0063661 A1 | 5/2002 | Comiskey et al. | 345/55 |
| 2002/0090980 A1 | 7/2002 | Wilcox et al. | 455/556 |
| 2002/0113770 A1 | 8/2002 | Jacobson et al. | 345/107 |
| 2002/0130832 A1 | 9/2002 | Baucom et al. | 345/107 |
| 2002/0180687 A1 | 12/2002 | Webber | 345/107 |
| 2003/0011560 A1 | 1/2003 | Albert et al. | 345/107 |
| 2003/0020844 A1 | 1/2003 | Albert et al. | 349/33 |
| 2003/0102858 A1 | 6/2003 | Jacobson et al. | 324/158.1 |
| 2003/0132908 A1 | 7/2003 | Herb et al. | 345/107 |
| 2003/0137521 A1 | 7/2003 | Zehner et al. | 345/589 |
| 2003/0151702 A1 | 8/2003 | Morrison et al. | 349/25 |
| 2003/0214697 A1 | 11/2003 | Duthaler et al. | 359/296 |
| 2004/0119681 A1 | 6/2004 | Albert et al. | 345/107 |
| 2005/0035941 A1 | 2/2005 | Albert et al. | 345/107 |

FOREIGN PATENT DOCUMENTS

| | | |
|---|---|---|
| EP | 1 145 072 B1 | 5/2003 |
| JP | 03-123322 A | 5/1991 |
| WO | WO 00/05704 | 2/2000 |
| WO | WO 00/36560 | 6/2000 |

| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Bach, U., et al., "Nanomaterials-Based Electrochromics for Paper-Quality Displays", Adv. Mater, 14(11), 845 (2002).

Bohnke et al., "Polymer-Based Solid Electrochromic Cell for Matrix-Addressable Display Devices." J. Electrochem. Soc., 138, 3612 (1991).

Bonhote, P., et al., "Novel electrochromic devices based on complementary nanocrystalline $TiO_2$ and $WO_3$ thin films", Solid Thin Films, 350, 269-275 (1999).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Egashira,. N., et al., "Solid electrochromic cell consisting of Lu-diphthalocyanine and lead fluoride", Proceedings of the SID, 28, 227 (1987).

Goodman, L.A., Passive Liquid Displays: Liquid Crystals, Electrophoretics and Electrochromics, Proceedings of S.I.D., 17, 30 (1976).

Graetzel, M., "Ultrafast colour displays", Nature, 2001, 409, 575.

Hagfeldt, A., et al., "Electrochromic switching with nanocrystalline $TiO_2$ semiconductor films modfied with surface attached viologens", Electrochem. Soc. Proc., 95(8), 143 (1995).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1 SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Qian, X., et al., "Surface photovoltage spectra and photoelectrochemical properties of semiconductor-sensitized nanostructured $TiO_2$ electrodes", Thin Solid Films, 385, 152-161 (2001).

Sapp, S.A., et al., "High Contrast Ratio and Fast-Switching Dual Polymer Electrochromic Devices", Chem. Mater., 1998, 10, 2101.

Wang, C., et al., "Electrochromic Nanocrystal Quantum Dots", Science, 2001, 291, 2390-2392.

Webber, R., "Image Stability in Active-Matrix Microencapsulated Electrophoretic Displays", SID 02 Digest, 126 (2002).

Wood, D., "An Electrochromic Renaissance?" Information Display, 18(3), (Mar. 24, 2002).

Yamaguchi, Y., et al., "Toner display using insulative particles charged triboelectrically", Asia Display/IDW '01, p. 1729, Paper AMD4-4 (2001).

Zhang, J. G., et al., "Chromic mechanism in amorphous $WO_3$ films", J. Electrochem. Soc., 1997, 144(6), 2022.

zum Felde, U., et al., "Electrochromism of Highly Doped Nanocrystalline $SnO_2$:Sb", J. Phys. Chem., 104, pp. 9388-9395. (2000).

* cited by examiner

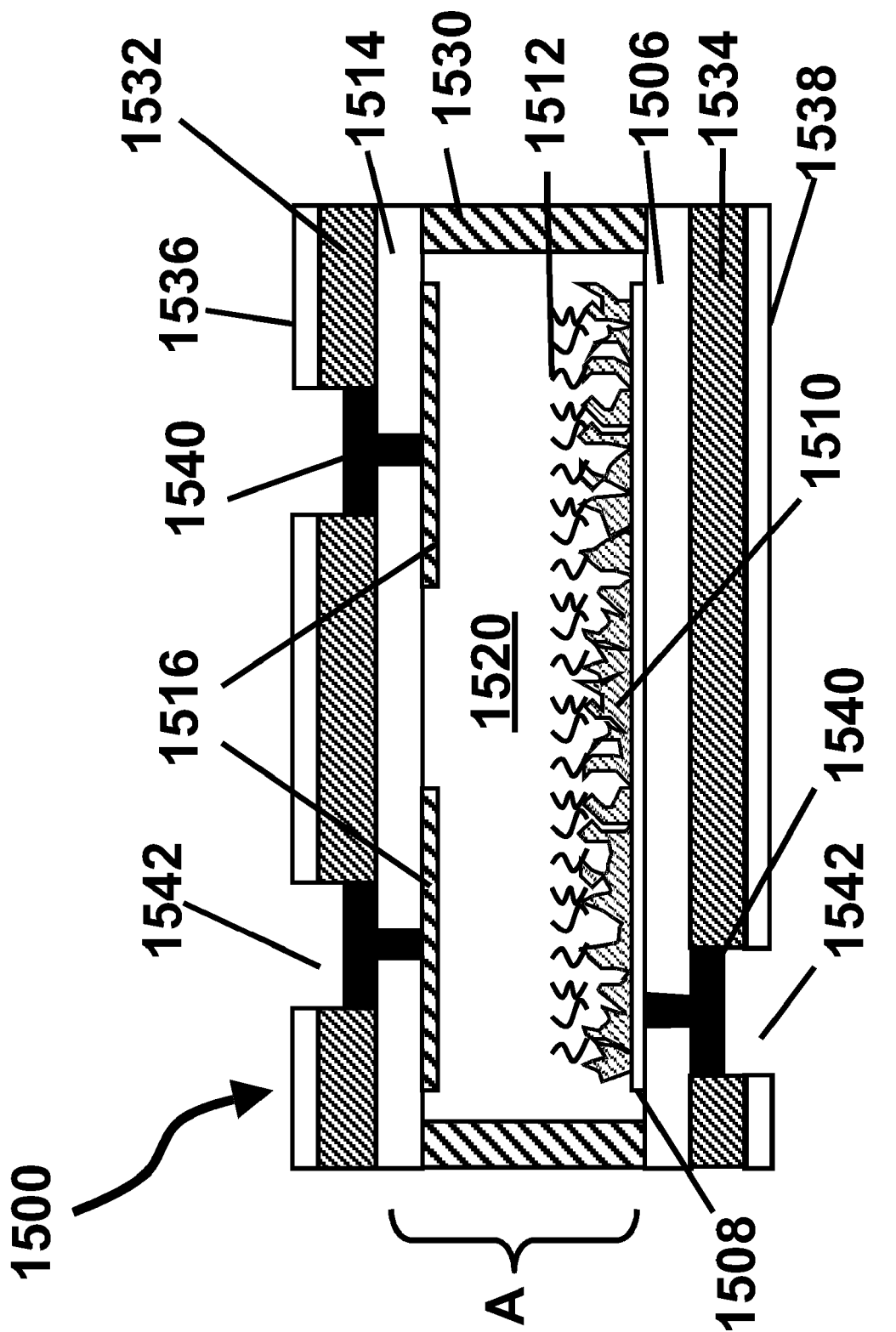

ELECTRO-OPTIC DISPLAYS, AND METHODS FOR DRIVING SAME

CROSS REFERENCE TO RELATED APPLICATIONS

This application is a divisional of copending application Ser. No. 10/249,128, filed Mar. 18, 2003, which itself claims priority from the following Provisional Applications: (a) Ser. Nos. 60/365,365; 60/365,368; 60/365,369; and 60/365,385, all of which were filed Mar. 18, 2002; (b) Ser. Nos. 60/319,279; 60/319,280; and 60/319,281, all of which were filed May 31, 2002; and (c) Ser. No. 60/319,438, filed Jul. 31, 2002. The entire contents of the aforementioned applications are herein incorporated by reference. The entire contents of all patents and published applications mentioned hereinafter are also incorporated herein by reference.

BACKGROUND OF INVENTION

The present invention relates to electro-optic displays and methods for driving such displays. Certain aspects of the present invention are directed especially to electrochromic displays, and more specifically to (i) electrochromic displays with solid charge transport layers; (ii) apparatus and methods for improving the contrast and reducing the cost of electrochromic displays; and (iii) apparatus and methods for sealing electrochromic displays from the outside environment and preventing ingress of contaminants into such a display.

Electro-optic displays are used in a wide variety of devices for displaying text, still image graphics, and moving pictures. (The term "electro-optic display" is used herein in its conventional meaning in the art to refer to a display using an electro-optic material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.) Devices that currently use electro-optic displays include digital wristwatches, calculators, personal digital assistants (PDA's), flat screen computer displays, laptop personal computers, and cellular phones. As the electro-optic display has evolved into an important and versatile interface to modern electronic appliances, the microelectronics industry and the display technology industry have formed a powerful technology partnership in developing new applications. The display industry has continually introduced new technologies for improved electro-optic display performance and the microelectronics industry has followed with the hardware and software to support these new displays.

The first electro-optic displays, including Nixie-tubes, were expensive and fragile, were severely limited in the data they could present, and required a significant amount of power, space, and support electronics. This hampered both their usefulness and acceptance. With the advent of the solid-state light emitting diode (LED), the cost, size, and circuit complexity for electro-optics were reduced and the technology was widely accepted, especially in numeric display applications. Control circuitry was easily implemented with existing digital circuit techniques but still required high power drive stages. Since LED's still drew a significant amount of power and could not easily scale to meet the increasing market demand for higher resolution displays, display development moved to new approaches.

In searching for a better method, investigation focused on optical properties of liquid crystals. U.S. Pat. No. 3,932,024, assigned to Dai Nippon Toryo Kabushiki Kaisha (Osaka, Japan), describes a liquid crystal display device comprising a pair of opposed electrode-mounted plates, each of which is provided with a polarizer, the planes of the two polarizers being perpendicular to each other, and a nematic liquid crystal layer. The electrode terminals are mounted on one plate by transferring the connection of one electrode to the opposite plate without directly contacting the liquid crystal material by interposing an electrically conductive material between the corresponding electrode terminal and the one electrode.

Common-plane-based LCD's are good for simple displays that need to show the same information over and over again. Watches and microwave timers fall into this category. Although a hexagonal bar shape is the most common form of electrode arrangement in such devices, almost any shape is possible. Examples of some of the electrode shapes defined in applications such as inexpensive handheld games include playing cards, aliens, fish, and slot machines.

Passive-matrix LCD's use a simple grid to supply the charge to a particular pixel on the display. The grids are formed on top and bottom glass layers called substrates. One substrate forms the "columns" and the other substrate forms the "rows". The wiring of the column or rows is made from a transparent conductive material, usually indium-tin oxide (ITO). The rows or columns are connected to integrated circuits that control when a charge is sent down a particular column or row. The liquid crystal material is sandwiched between the two glass substrates, and a polarizing film is added to the outer side of each substrate. To turn on a pixel, the integrated circuit sends a charge to the correct column of one substrate and electrically grounds the associated row where the intersection of the row and the column will determine the "pixel" or cell element to be activated. The row and column intersect at the designated pixel, and that delivers the voltage to untwist the liquid crystals at that pixel.

The passive-matrix system is simple and cost effective, but it has significant drawbacks, notably slow response time and imprecise voltage control. Response time refers to the LCD's ability to create or recreate (refresh) the image displayed. Slow response time is especially noticeable in pointer- or mouse-driven graphical user interfaces. In addition, imprecise voltage control hinders the passive matrix's ability to influence only one pixel at a time. When voltage is applied to untwist one pixel, the pixels around it also partially untwist, which makes images appear fuzzy. Therefore, each pixel lacks contrast with its neighboring pixel.

The active-matrix LCD was developed to ameliorate many of the limitations of the passive-matrix display. In this type of LCD display, the addressing takes place completely behind the liquid crystal film. The front surface of the display is coated with a continuous electrode while the rear surface electrode is patterned into individual pixels. A thin film transistor (TFT) acts as a switch for each pixel. The TFT is addressed by a set of narrow multiplexed electrodes (gate lines and source lines) running along the gaps between pixels. A pixel is addressed by applying current to a gate line that switches the TFT on and allows a charge from the source line to flow on to the rear electrode. This sets up a voltage across the pixel and turns it on. An image is created similar to the passive display as the addressing circuitry scans across the matrix. By controlling the amount of voltage supplied to a pixel crystal, the amount of crystal twist can be controlled. By doing this in exact, minute increments, active-matrix LCD's can display usable gray scale images. The active-matrix display technology offers improved response time, viewing angle, contrast, and intensity control as compared with passive-matrix LCD's. Hence active matrix displays are the technology of choice for high-resolution electro-optic computer applications.

In all LCD displays, the liquid crystal material is activated by a discrete applied voltage (e.g., 5 volts) and the liquid crystal changes its optical properties in response to that voltage. When the voltage is removed from the cell, the liquid crystal returns to its original state. The hardware that drives the LCD can consist of simple combinatorial digital logic. Slightly more complex circuits can be used that take into account knowledge of specific display performance variables, such as cell transition times or ambient temperature response. When different levels of twist are required, i.e., gray scale, control of the applied voltage level is required, necessitating more complex drive circuitry and knowledge of the optical properties versus voltage curve.

To provide full color in an LCD, each individual pixel is divided into three sub-pixels, normally red, green, and blue (RGB). Applying color filters that only allow certain wavelengths to pass through them while absorbing the rest creates these sub-pixels. With a combination of red, blue, and green sub-pixels of various intensities, a pixel can be made to appear any number of different colors. The number of colors that can be made by mixing red, green, and blue sub-pixels depends on the number of distinct gray scale levels (intensities) that can be achieved by the display.

The liquid crystal-based electro-optic display industry has been subject to the same cost/performance market pressure as the microelectronics industry. As a result, LCD's have been following a trend towards increased density, improved color depth, faster response time, and lower cost. The hardware and software used to control these voltage-driven devices are well known, well characterized and relatively simple, thus allowing for ease of hardware/software/display integration, and this has contributed to widespread adoption of the technology.

However, LCD's do have some inherent drawbacks. Transmissive LCD's require backlighting, which draws significant power. Also, the contrast, though much improved over early implementations, is inherently limited to the background and foreground colors and color differentiation. Reflective LCD's (which essentially place a reflector on the opposed side of the display from the observer) have insufficient contrast for many applications. Typically, LCD's require special packaging to keep the liquid crystal in a predetermined region in each cell and in the overall display. Furthermore, since the extent of rotation of the plane of polarization of light by the liquid crystal depends upon the thickness of liquid crystal layer, this thickness must be accurately maintained, which renders it very difficult to prepare LCD's on flexible substrates.

One type of non-liquid crystal electro-optic display, namely organic light emitting diode (OLED) displays, has found favor where low power, high contrast, and fast response times are required. The OLED technology has shown great potential but limited commercial viability, due to some significant performance issues.

OLED's are usually arranged in an active-matrix arrangement, similar to that used in LCD's. However, the electrical requirements of the OLED pixel circuit are significantly different. This circuit must provide a constant current to the OLED device, but the magnitude of the current must be controllable over a range of more than two orders of magnitude in order to allow for high-contrast images. Typically, in active-matrix OLED displays, there are two metal oxide semiconductor field effect transistor (MOSFET) drivers at each pixel. A voltage is applied for a set period of time to the first transistor, causing it to turn on and conduct, storing a charge on a capacitor. This capacitor then connects to the gate of a second transistor, and causes the latter to conduct charge to the OLED pixel, a process that continues until another signal is applied to discharge the capacitor. Thus, the OLED emits continuously at an intensity defined by the rate of charge flow (current).

The current source is one of the two critical components of the OLED pixel cell, and its design is set by the actual pixel current requirement. This requirement in turn is derived from the target luminance, the OLED efficiency, the color filter transmission (when used), the relative and absolute areas of the color sub-pixels, and the duty cycle of the pixel.

The second most important component of an active-matrix OLED pixel cell is the storage element. Even though an OLED is current driven, the most practical way to store energy is the capacitor. Fortunately, a MOSFET is a fairly good voltage-to-current converter, when driven properly, so that, in essence, each pixel is driven by a current driver that is controlled externally by an applied voltage.

In many ways, the OLED has the same benefits of external drive circuit simplicity as the active-matrix LCD. However, many technological challenges lie ahead before OLED's can become a commercially viable display technology; these challenges include short operational life and susceptibility to moisture, which degrades the displays, and requires the use of special hermetically sealed packages. Indeed, some modern OLED's are sealed in "can packages" with desiccants inside the package to absorb moisture. This type of packaging increases the cost of the overall displays and severely limits the use of these displays, since the hermetically sealed packing is difficult to scale down in thickness and therefore is not useable for very thin display devices (credit card type displays, flexible displays, etc.). It is also difficult to scale OLED displays to large sizes because of high defect densities and the technical difficulties associated with making OLED's in large area form factors.

Another type of electro-optic display is a particle-based electrophoretic display, described for example in U.S. Pat. Nos. 3,668,106; 3,756,693; and 3,767,792. Particle-based electrophoretic displays make use of one or more types of electrically-charged particles dispersed in a suspending fluid. Known electrophoretic media can be divided into two main types, referred to hereinafter for convenience as "single particle" and "dual particle" respectively. A single particle medium has only a single type of electrophoretic particle suspended in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles are black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility, will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described. (The term "gray state" is used herein in its conventional meaning in the imaging art to refer to a state intermediate two extreme optical states of a pixel of a display, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned, the transition between the two extreme states may not be a color change at all.)

Electrophoretic displays can have attributes of good brightness and contrast, wide viewing angles, optical state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Published Patent Application 2002/0180687 that some particle-based electro-optic displays capable of gray scale are stable not only in their extreme black and white states but also in their intermediate gray states. This type of display is properly called "multi-stable" rather than bistable, although for convenience the term "bistable" will be used herein to cover both bistable and multi-stable displays.) Nevertheless, problems with the long-term image quality of electrophoretic displays such as those described in the three aforementioned patents have prevented their widespread usage. For example, the dispersed particles used in electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; and 6,531,997; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0154382, 2002/0171910; 2002/0180687; 2002/0180688; 2002/0185378; 2003/0011560; 2003/0011867; and 2003/0025855; and International Applications Publication Nos. WO 99/67678; WO 00/05704; WO 00/20922; WO 00/38000; WO 00/38001; WO 00/36560; WO 00/67110; WO 00/67327; WO 01/07961; WO 01/08241; and WO 01/17029.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6-19. See also the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

It should be noted that, although electrophoretic displays are often opaque (since the particles substantially block transmission of visible light through the display) and operate in a reflective mode, electrophoretic displays can be made to operate in a so-called "shutter mode" in which the particles are arranged to move laterally within the display so that the display has one display state which is substantially opaque and one which is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. application No. 2002/0075556, both assigned to Sipix Imaging, Inc.

Unlike the previous discussed display technologies, particle-based electrophoretic displays act, to a first approximation, as impulse transducers, so that the final state of a pixel depends not only upon the electric field applied and the time for which this field is applied, but also upon the state of the pixel prior to the application of the electric field.

Writing/clearing pixels in particle-based electrophoretic displays, or changing gray scale in such pixels involves switching voltages on and off or applying opposite voltages to move the appropriate particles into the desired position. Knowledge of (1) the initial state of the pixel, (2) the time required to move the particles, i.e., the transition time, (3) the time at voltage curve vs. optical properties, and (4) the relaxation time of the pixel is important to provide a high quality image on a particle-based electrophoretic display.

Color electrophoretic displays can be implemented using red/green/blue particles. To accomplish this, either each particle type needs to react to a different voltage level or each colored particle within a pixel would require a separate sub-pixel.

Another type of electro-optic display similar to a particle-based electrophoretic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Finally, another type of electro-optic display is an electrochromic display; this type of display uses a material which changes at least one optical characteristic as electrons are added thereto or removed therefrom. (Electrochromism is defined as a reversible color change of a material caused by the application of an electrical current.) Several types of electrochromic displays are known. According to U.S. Pat. No. 6,301,038 (derived from International Application PCT/IE98/00008, Publication No. WO 98/35267), one type of electrochromic display is based on ion insertion reactions at metal oxide electrodes. To ensure the desired change in transmittance the required number of ions must be intercalated in the bulk electrode to compensate the accumulated charge. However, use of optically flat metal oxide layers requires bulk intercalation of ions as the surface area in contact with electrolyte is not significantly larger than the geometric area. As a consequence the switching times of such a device are typically of the order of tens of seconds.

Also according to the same U.S. Pat. No. 6,301,038, a second type of electrochromic display is based on a transparent conducting substrate coated with a polymer to which is bound a redox chromophore. On applying a sufficiently negative potential, the electrochromic polymer is typically oxidized from its neutral state to a deeply colored form, the color of which depends upon the nature of the polymer. Among the electrochromic polymers which may be used in this type of display are polythiophenes, polypyrroles, and polyanilines. To ensure the desired change in transmittance a sufficiently thick polymer layer is required, the latter implying the absence of an intimate contact between the transparent conducting substrate and a significant fraction of the redox chromophores in the polymer film. As a consequence the switching times of such a device are, as above, typically of the order of tens of seconds.

The aforementioned U.S. Pat. No. 6,301,038 describes an electrochromic display in which the active layer (i.e., the layer whose optical characteristics are varied by addition or removal of electrons) is a nanoporous-nanocrystalline film comprising a semi-metallic oxide having a redox chromophore adsorbed thereto. In the related WO 01/27690 (see also Wood, D., "An Electrochromic Renaissance?", Information Display, 18(3), 24 (March 2002, hereinafter referred to as the "Wood article"—the entire disclosure of this article is herein incorporated by reference) broadens the concept to a nano-porous, nano-crystalline film comprising a conducting metal oxide having an electroactive compound which is either a p-type or n-type redox promoter or p-type or n-type redox chromophore adsorbed thereto. Furthermore, the present invention further broadens the concept by removing the limitation to adsorption of the electroactive compound, and provides that this compound may be chemically bonded to the metal oxide. The present invention extends to displays using this type of chemically-bonded electroactive compound, as well as to displays using solid electrolytes, as described in more detail below. Although most aspects of the present invention will primarily be described with specific reference to embodiments of the type described in the aforementioned U.S. Pat. No. 6,301,038, the necessary modifications to embodiments of the types described in the aforementioned WO 01/27690 and Wood article and the types using solid electrolytes will readily be apparent to those skilled in the technology of electrochromic displays.

For an electronic display, the electrochromic effect is only useful if the color change is truly reversible. Typically, a current flow in one direction causes a color to form, while reversing the current flow causes the color to disappear (bleach). Materials showing this effect are known as electrochromic and may be organic (carbon-based) or inorganic in character.

FIG. 1 of the accompanying drawings shows a schematic cross-section through a display (generally designated 100) described in the aforementioned U.S. Pat. No. 6,301,038. The display 100 comprises a first glass substrate 102, a first fluorine-doped tin-oxide coated conductive layer 104, a nano-structured film 106 of titania ($TiO_2$) coated on the first conductive layer 104, a redox chromophore 108 adsorbed on the titania in the film 106, an electrolyte or electron donor solution 110, a second conductive layer 112 of fluorine-doped tin oxide, and a second glass substrate 114. The redox chromophore can be any of a variety of N,N-disubstituted derivatives of 4,4'-bipyridyl, the preferred one being N,N'-bis(2-phosphonoethyl)-4,4'-bipyridinium dichloride (referred to as bis(2-phosphonoethyl)-4,4'-bipyridinium dichloride in the aforementioned U.S. Pat. No. 6,301,038).

The aforementioned Wood article describes what is apparently a later variation of the same process, in which the substrates 102 and 114 are formed of glass coated with indium tin oxide (ITO), as used in LCD's. The first substrate 102 (which forms the front electrode in the final display) is coated with the same anatase titania/redox chromophore layer, the redox chromophore being a viologen. The second substrate 114 is covered (apparently over the ITO layer thereon) with a nano-structured antimony-doped tin oxide film, and then with a white reflective layer made of titania. This titania layer is stated to be porous enough for lithium ions to pass therethrough, but the light-scattering properties of the titania produce a solid-white reflector. The display is then filled with the inert electrolyte 110.

FIG. 2 of the accompanying drawings is a flow chart of a method (generally designated 200) for preparing the display 100 shown in FIG. 1. In a first step 202, a colloidal titania dispersion is prepared by hydrolysis of titanium tetraisopropoxide; titanium tetrachloride may alternatively be used. The average diameter (7 nm) of the initially formed crystallites is increased to 12 nm by autoclaving at 200° C. for 12 hours. The autoclaved dispersion is concentrated to a solids content of 160 g/l and Carbowax 20000 (40% wt. equiv. of $TiO_2$) is added to yield a white viscous sol. (Carbowax 20000, a Registered Trade Mark, is an ethylene glycol polymer of average molecular weight 20000.) The resultant sol is then, in a step 204, printed on to a glass substrate carrying a conducting layer. More precisely, a 4 μm thick layer of the sol, 25 mm by 25 mm in size, is deposited using a screen-printing printing technique on top of a 33 mm by 33 mm fluorine-doped tin oxide layer on a glass substrate formed of Glastron®. The resulting gel-film is dried in air for 1 hour, sintered at 450° C. for 12 hours and stored in a darkened vacuum desiccator prior to use.

Separately, in a step 206, a redox chromophore, N,N'-bis-(2-phosphonoethyl)-4,4'-bipyridinium dichloride, is prepared by adding 4,4'-bipyridyl (4.4 g) and diethyl 2-ethylbromophosphonate (15.0 g) to water (75 ml). The reaction mixture is refluxed for 72 hours and allowed to cool. Following addition of concentrated hydrochloric acid (75 ml), the reaction mixture is refluxed for a further 24 hours. To recover the desired product, the reaction mixture is concentrated to 50 ml, isopropyl alcohol (200 ml) is added dropwise, and the mixture is stirred on ice for one hour and filtered. The white crystalline product is washed with cold isopropyl alcohol and air-dried to give pure N,N'-bis-(2-phosphonoethyl)-4,4'-bipyridinium dichloride.

In the next step 208 of the process, the redox chromophore prepared in step 206 is adsorbed on to the titania-coated substrate prepared in step 204 above. More precisely, the titania films are modified by adsorption of the redox chromophore from an aqueous solution (0.02 mol. $dm^{-3}$) over 24 hours, washed with distilled de-ionized water, dried in air, and stored in a darkened vacuum desiccator for 48 hours prior to use.

The remaining steps of the process may be most easily understood by referring both to FIG. 2 and to FIGS. 3A and 3B. FIG. 3A shows, in schematic side elevation, an assembly (generally designated 300) being used to form the complete display 100 (except for the electrolyte 110). The assembly 300 comprises a front electrode assembly (FIG. 3A is inverted for ease of comprehension) consisting of a first glass substrate 302 (which will eventually form the glass substrate 102), a first tin-oxide coated conductive layer 304 (which will eventually form the conductive layer 104), and a nano-structured film of titania 306 (which will eventually form the film 106). The assembly 300 further comprises a rear electrode assembly, the construction of which will now be described with reference to FIGS. 3A and 3B.

FIG. 3B shows a top plan view of the pattern in which adhesive is applied to the second substrate prior to the final assembly. The first step 210 (FIG. 2) of the final assembly is the deposition, using a screen printing technique, of a 2.5 mm order 116 of a commercial epoxy resin (Araldite®) on to a second 33×33 mm glass sheet 308 provided with a layer 310 of fluorine-doped tin oxide; this second glass sheet 308 eventually forms the second glass substrate 114, while the tin oxide layer 310 eventually forms the second conductive layer 112. As best seen in FIG. 3B, a small opening 118 is left in one corner of the border 116. The adhesive-coated piece of conducting glass is placed on top of the first glass sheet bearing the modified titania film prepared as described above and the resultant assembly is left for 24 hours to enable the adhesive to set, thus forming the final assembly 100, except for the absence of the electrolyte 110.

To complete construction of the electrochromic system, the above sandwich structure is, in a step 212, back-filled under argon pressure with an electrolyte solution consisting of lithium perchlorate (0.05 mol. $dm^{-3}$) and ferrocene (0.05 mol. $dm^{-3}$) in γ-butyrolactone (m.pt. −45° C., b.pt. 204° C.). The components of the electrolyte solution are carefully purified and rigorously dried prior to use. Finally, in a step 214, the opening 118 is closed using the same commercial epoxy adhesive as before.

In operation of the display 100, the nano-structured titania film 106 colors on application of a potential sufficiently negative to accumulate electrons in the available trap and conduction band states. According to the aforementioned U.S. Pat. No. 6,301,038, as a consequence of the high surface roughness of this nano-structured film, ions are readily adsorbed/intercalated at the oxide surface, permitting efficient charge compensation and rapid switching, i.e., the need for bulk intercalation is eliminated. However, despite the rapid switching times in such films, the associated change in transmittance is not sufficient for a commercial device. To overcome this limitation, redox chromophore 108 is adsorbed at the surface of the transparent nano-structured film; this chromophore, when reduced, increases the extinction coefficient of an accumulated trapped or conduction band electron by more than an order of magnitude. Furthermore, due to the nano-porous structure and associated surface roughness of the nano-crystalline films used, the redox chromophore is effectively stacked as in a polymer film, while at the same time the intimate contact of the chromophore with the metal oxide substrate necessary to ensure rapid switching times is maintained.

One potentially important market for electro-optic "displays" (or rather electro-optic systems) is windows with variable light transmission. As the energy performance of buildings and vehicles becomes increasingly important, electro-optic media could be used as coatings on windows to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass, angle-independent high-contrast large-area displays, glare-guards in electronic devices, and electronic scratchpads.

In order to increase the usability of electrochromic displays, there are significant challenges to overcome that will allow for improved product life, lower costs, and wider manufacturing process conditions to produce a larger portfolio of product types without significant increase in process design and hence increased costs and delay of entry into the market.

A first aspect of the present invention seeks to reduce or eliminate one major limitation of the prior art electrochromic display described in the aforementioned U.S. Pat. No. 6,301, 038, WO 01/27690 and Wood article, namely that great care must be taken to contain the liquid electrolyte and to create the seal. This step is expensive and can lead to product defects if the seal leaks, which is possible with changes in temperature (temperature cycling).

This first aspect of the present invention also seeks to reduce or eliminate another limitation of such prior art electrochromic displays, namely that the switching response of the display is limited to the speed at which the ions can transport across the electrolyte, and that therefore, such displays are limited to slow speed applications.

This first aspect of the present invention also seeks to reduce or eliminate another limitation of liquid electrolyte electrochromic displays, namely that it is difficult to create isolated cells unless an electrolyte seal is used for each display cell element, which both causes great expense and limits density (i.e., how closely display cells can be packed). When the cells are close together, ion transport of one cell can create ion transport of neighboring cells and therefore can cause the neighboring non-activated cells to become somewhat activated, resulting in a loss of clarity or resolution. In order to overcome this in the current art, the cells are not packed closely together, preventing optimized resolution.

The first aspect of the present invention seeks to provide to create an electrochromic display that is low cost, high density, fast, and long lasting, but which does not need a liquid electrolyte.

The first aspect of the present invention also seeks to provide a structure and method of making the structure that has a high-speed solid charge transport layer between the display conductive elements and the redox promoter or chromophore. (Note that in such a display holes must move when electrons are used to produce the electrochromic effects. If oxidation is used to produce the electrochromic effects, the charge transport layer can be an electron transport layer. Of course, holes moving in one direction are equivalent to electrons moving in the other.)

The first aspect of the present invention also seeks to provide a structure and method of making the structure that has a high-speed solid charge transport layer between the display conductive element and the redox promoter or chromophore where the redox promoter or chromophore is improved for efficiency by chemically adding a charge transport polymer to the redox promoter or chromophore prior to adding the solid charge transport layer.

The first aspect of the present invention also seeks to provide a structure and method of making the structure that has a high-speed solid charge transport layer between the display elements and the redox promoter or chromophore where the solid charge transport layer is patterned and aligned to the display elements.

A second aspect of the present invention is directed to increasing the usability of electrochromic displays in VT and other applications by making the displays more readable by providing better contrast between the on/off states, as well as better contrast between different gray levels. Currently electrochromic displays are limited in contrast, because although the redox chromophores change color when ion transport occurs, they do so against a clear electrolyte, and a thin (3-4 μm) roughened surface, which is not optimized for contrast, since it is chosen to enhance the amount of surface area for the connection of redox chromophore and not for particular optical properties.

This second aspect of the present invention also seeks to increase the range of applications of electrochromic displays by providing a low-cost electrochromic display manufacturing process that integrates with other processes such as flexible polymer substrate processes is required. Currently, electrochromic display manufacturing processes are time consuming (>12 hours of preparation time) and therefore are costly. In addition, because of the high-temperature (450° C.) titania sintering step, these processes do not integrate well with low-temperature plastic-based processes for producing flexible displays.

The second aspect of the present invention seeks to provide a structure for and method of making low-cost electrochromic displays. This second aspect also seeks to provide a structure for and method of making electrochromic displays that has at least one of the following advantages: (a) less time consuming; (b) more easily integrated with other manufacturing processes; (c) providing displays that are more readable and have enhanced contrast; (d) providing displays that have a very high surface roughness of nano-structured film to further enhance contrast; and (e) providing displays that have both an improved electrolyte and a very high surface roughness of nano-structured film to further enhance contrast.

A third aspect of the present invention relates to reducing the susceptibility of electrochromic displays to environmental factors. Application of electrochromic media in VT windows will necessarily expose the media to substantial variations in environmental conditions, and in the present state of electrochromic technology, the applications of electrochromic media are, the present inventors have realized, significantly limited by the susceptibility of such media to many environmental factors, such as light, moisture, oxygen, and electrostatic discharge. Reducing the susceptibility of the media to such factors would allow for improved product life, lower costs, and wider manufacturing process conditions to produce a larger portfolio of product types without significant increase in process design and hence increased costs and delay of market entry.

One major limitation of electrochromic media, the present inventors have realized, is the susceptibility of the redox chromophore to light degradation. Under excessive ultraviolet (UV) radiation exposure (in terms of total flux by either high doses or lower doses over long periods), the redox chromophore may degrade or detach from the nano-structured titania film. Titania is notorious for its photocatalytic ability, under UV illumination, to catalyze the oxidation of organic materials, typically to carbon dioxide and water. Indeed, titania is used for precisely this reason in anti-microbial materials in air conditioning filters and medical devices, waste water treatment and air decontamination. Such photocatalytic oxidation of organic materials is of course enhanced as the concentration of molecular oxygen in the medium increases. The photocatalytic oxidation is also enhanced as the concentration of water in the medium increases, since titania can photocatalytically split water to produce hydrogen and oxygen, so that the presence of water inherently produces an increase in oxygen concentration. Furthermore, it is known that water may act as a nucleophile under certain conditions and, in the presence of titania, water may nucleophilically attack the aromatic groups present in the chromophore, producing products of unknown chemistry which are likely to have properties significantly different from those desired in the chromophore.

The susceptibility of components of the electrochromic medium to degradation by oxygen in the presence of titania is enhanced by the oxidation and reduction reactions which take place at the electrodes during switching of the state of the medium, since it is well known that many compounds are more susceptible to such degradation reactions as they are being generated at an electrode.

Another problem with electrochromic media, the present inventors have realized, is their susceptibility to damage by discharges of static electricity, such as triboelectric charges built up during assembly of a display or its handling as it is moved to a desired location. Static electricity is typically of very high voltage, orders of magnitude larger than the relatively small voltages, around 1 to 2 Volts, needed to switch electrochromic media. Static discharges can damage electronic parts and affect components of the media, especially where the discharge passes through interfaces. Although the exact reactions involved are not completely understood, exposure of electrochromic media to large "over potentials" beyond the working voltage of the media can degrade the redox chromophore by oxidation or reduction. Under such high voltage discharges, the aromatic chromophores may be altered by, for example, intramolecular cyclizations and rearrangements and/or intermolecular coupling or other similar reactions with adjacent chromophores.

Another possible problem with electrochromic media, the present inventors have realized, is interaction between pixels. The aforementioned U.S. Pat. No. 6,301,038 describes direct drive electrochromic displays having multiple pixels integrated together using a common electrolyte seal. The seal used in the prior art to keep the electrolyte inside the display is the border of epoxy resin. Because groups of pixels use a common electrolyte and because fields of one pixel are not well isolated from neighboring pixels, these non-isolated fields could create ion transport near neighboring pixels. Hence, these non-isolated fields may modify the redox chromophore and further degrade the lifetime of the redox chromophore in that region (e.g., redox chromophore designed to be "off" is "on" to a certain level systematically more often than it was designed to be).

Another problem with electrochromic media, the present inventors have realized, is high fields caused by a lack of height or distance control within an electrochromic display between the glass substrates, for example as shown in FIG. 1. A user who presses on the first glass substrate moves the display surfaces closer together and, when in operation, the field strength then increases significantly because the field is proportional to the inverse of the distance. Hence, the electrodes and other components of the display can degrade due to arcing, shorting, or excessive ion transport.

The third aspect of the present invention seeks to provide a means for and method of making a total environmental seal for electrochromic displays for sealing out unwanted light, unwanted moisture, unwanted oxygen ($O_2$), unwanted electrostatic charge, and unwanted fields.

The first, second and third aspects of the present invention discussed above all relate to improvements in electrochromic displays. However, the present invention has a fourth aspect which is applicable to all electro-optic displays, not merely electrochromic displays, and this fourth aspect of the present invention relates to a system and method of operation for integrating and controlling an electro-optic display.

As already mentioned electrochromic devices have been in use for some time in relatively simple applications such as the electrochromic rear view mirrors for motor vehicles. These electrochromic mirrors change from the full reflectance mode (day) to the partial reflectance mode(s) (night) for glare-protection purposes from light emanating from the headlights of vehicles approaching from the rear. However, recent research into the production of nano-crystalline electrochromic display elements based on chemically modified nano-structured meso-porous films indicates that electrochromism can be extended to the high density electronic display market and can favorably compete with LCD's in certain applications.

Also as already mentioned, U.S. Pat. No. 6,301,038 describes an electrochromic display in which the active layer (i.e., the layer whose optical characteristics are varied by addition or removal of electrons is a nano-porous-nano-crystalline film comprising a semi-metallic oxide having a redox chromophore adsorbed thereto. Also as already mentioned, this patent describes a nano-crystalline electrochromic system comprising a first electrode disposed on a transparent or translucent substrate and a second electrode, an electrolyte, an electron donor and a nano-porous-nano-crystalline film of a semiconducting metallic oxide having a redox chromophore adsorbed thereto being intermediate the first and second electrodes. In FIG. 4 is illustrated a nano-crystalline electrochromic display cell 400 similar to those described in this patent. Nano-crystalline electrochromic display cell 400 consists of a first glass substrate 410, a fluorine-doped tin-oxide coated conductive layer 420, a terminal 425, a nano-structured film of titania 430, a redox chromophore 440, an electrolyte solution 450, a conductive element 460, a terminal 465, a conductive element 470, a terminal 475, and a second glass substrate 480.

Redox chromophore 440 is colorless in the oxidized state and colored in the reduced state. It is linked to the surface of nano-structured titania 430, a nearly colorless semiconductor, on the first glass substrate 410. When a current is allowed to flow from terminal 465 to terminal 425, electrons are injected from first glass substrate 410 into the conduction band of the semiconductor nano-structured titania film 430, and this current reduces the redox chromophore 440. This reduction is reversible: application of a reverse current re-bleaches the redox chromophore 440 by oxidation.

A major potential advantage of nano-crystalline electrochromic display technology is the ability to create a true "paper-like" display. A combination of high reflectivity and achievable contrast ratio gives the nano-crystalline electrochromic display an appearance that is more like ink on paper than most other display technologies available and that can be read at very large angles to the perpendicular (again, like paper). An additional advantage is that nano-crystalline electrochromic displays can be made bi-stable, meaning that once switched on, a pixel will stay colored until actively bleached. In other words, no power is consumed to keep a pixel colored. This, combined with the fact that the display is reflective, needing no backlighting, means that the displays can be designed to require very little power to operate. This could provide a significant market advantage in handheld, battery operated electronic devices such as cellular phones, PDA's, and electronic books.

Nano-crystalline electrochromic-based display cells have been studied as individual cells, under simple direct drive operation, whereas none of the known art discusses active matrix displays. Indeed, it is not quite clear how to make active matrix nano-crystalline electrochromic displays since a common electrolyte that is used between cells may cause interference between cells in an active matrix.

Even in direct-drive nano-crystalline electrochromic displays, the system (electronics/software/display) and method of operation are complex because, as in the electrophoretic display cell discussed earlier, the state of the cell before it is written is critical in determining how to change the cell state.

FIG. 5 shows a simplified electrical circuit model (generally designated 500) of the nano-crystalline electrochromic display cell 400 shown in FIG. 4. Electrical circuit model 500 consists of terminal 465 and terminal 425 as described above with reference to FIG. 4, a resistor 510, a resistor 520, and a capacitor 530.

Resistor 510 represents the summed series impedance of terminal 465, terminal 425, conductive layer 420, nano-structured titania film 430, redox chromophore 440, conductive element 460, and terminal 465. Capacitor 530 represents the capacitance of electrolyte solution 450. Resistor 520 represents the sum of the impedance as represented by resistor 510 and the series impedance of electrolyte solution 450. Resistor 520 has a characteristic impedance that is much larger than that of resistor 510. It should be noted that a considerably more complex small-signal model could be developed for nano-crystalline electrochromic display cell 400. Of special interest would be inclusion of the variable diodic behavior of nano-structured titania film 430.

In order to take competitive advantage of the potential of electro-optic display technologies, and in particular of the encapsulated electrophoretic, rotating bichromal member and electrochromic display technologies described above, the displays need to be more readable, and hence require better contrast between the "on/off" states as well as better contrast between different "gray levels". A key technique in achieving this is to drive the electro-optic display in a manner which takes into account environmental factors. For example, the nano-crystalline electrochromic display cell 400 should be driven in a manner that takes into account many factors. The nano-crystalline electrochromic display cell 400 drive system must account for (1) the steady-state response of resistor 510, resistor 520, and capacitor 530; (2) the time-varying response of resistor 510, resistor 520, and capacitor 530; (3) interactions with adjacent cells; (4) light reflectivity vs. ion transport curve for redox chromophore 440; (5) ion transport efficiency; (6) variable diodic behavior of nano-structured titania film 430; (7) interaction of optical feedback; (8) electrolyte potential changeover; (9) changes over operating life of electrolyte solution 450 performance; (10) changes over operating life of redox chromophore 440 performance; (11) effects of ambient and operating temperatures on cell performance; and (12) effects of ambient light on display quality.

Similarly, it has been observed that the optical characteristics of encapsulated electrophoretic media vary as a function of temperature and humidity, and the "age" of the medium; this aging phenomenon is affected by both the chronological age of the medium, that it to say the period since the medium was manufactured, and the "operating age", that is to say the period for which the medium has been driven. More specifically, the electrical resistivity of an encapsulated electrophoretic medium varies inversely with temperature, decreasing as the temperature increases. This variation of electrical resistivity with temperature affects how much current passes through the medium when it is driven with a constant drive pulse, and this is turn affects the rate at which the medium switches and the rate at which the medium ages during use. Thus, using a fixed drive pulse with an encapsulated electrophoretic medium which is undergoing changes in ambient temperature and humidity, and is also aging, can lead to substantial and undesirable changes in the optical properties of the medium. Such changes can include the reflectances of the white and dark states of the medium and the intermediate gray states (if any), and hence also the contrast ratio of the medium. For example, the medium may show acceptable properties when switched at room temperature, but its contrast ratio may be reduced when operating at low temperatures, and the medium may be over-saturated and/or over-driven at high temperatures; such over-driving is undesirable because it tends to reduce the working lifetime of the medium.

Changes in environmental conditions may also cause problems with self-erasing of the medium. "Self-erasing" (see, for example, Ota, I., et al., "Developments in Electrophoretic Displays", Proceedings of the SID, 18, 243 (1977), where self-erasing was reported in an unencapsulated electrophoretic display) is a phenomenon whereby, when the voltage applied across certain electrophoretic media is switched off, the electrophoretic medium may reverse its optical state, and in some cases a reverse voltage, which may be larger than the operating voltage, can be observed to occur across the electrodes adjacent the medium. It appears (although this invention is in no way limited by this belief) that the self-erasing phenomenon is due to a mismatch in electrical properties between various components of the display. Obviously, self-erasing is highly undesirable in that it reverses (or otherwise distorts, in the case of a grayscale medium) the desired optical state of the medium.

Similar problems are encountered with other types of electro-optic media. For example, the switching characteristics of rotating bichromal member media will vary with temperature due to changes with temperature in the viscosity of the liquid medium which surrounds the rotating bichromal members, and such temperature-dependent changes may affect the gray scale of the medium.

In its fourth aspect, the present invention seeks to provide a system and method of operation for integrating and controlling an electro-optic display.

The fourth aspect of the present invention also seeks to electrically drive an electro-optic display to provide controlled dark and white states, and controlled intermediate states (gray scale) in displays capable of such gray scale.

The fourth aspect of the present invention also seeks to electrically drive an electro-optic display for optimum steady-state performance.

The fourth aspect of the present invention also seeks to electrically drive an electro-optic display for optimum time-varying performance.

The fourth aspect of the present invention also seeks to electrically drive a nano-crystalline electrochromic display cell that compensates for interference from adjacent cells.

The fourth aspect of the present invention also seeks to electrically drive a nano-crystalline electrochromic display cell that compensates for variations in light reflectivity vs. ion transport curve for redox chromophores.

The fourth aspect of the present invention also seeks to electrically drive a nano-crystalline electrochromic display cell that compensates for variations in ion transport efficiency.

The fourth aspect of the present invention also seeks to electrically drive a nano-crystalline electrochromic display cell that compensates for variations in diodic behavior of a nano-structured titania film.

The fourth aspect of the present invention also seeks to electrically drive an electro-optic display that compensates for the interaction of optical feedback.

The fourth aspect of the present invention also seeks to electrically drive a nano-crystalline electrochromic display cell that compensates for electrolyte potential changeover.

The fourth aspect of the present invention also seeks to electrically drive an electro-optic display in a manner that incorporates the material aging aspects of the electro-optic medium.

The fourth aspect of the present invention also seeks to electrically drive an electro-optic display in a manner that compensates for the effects of ambient and operating temperatures on electro-optic medium performance.

The fourth aspect of the present invention also seeks to electrically drive an electro-optic display in a manner that compensates for ambient light conditions.

SUMMARY OF INVENTION

In its first aspect, the present invention provides an electrochromic display, of the type described in the aforementioned U.S. Pat. No. 6,301,038, WO 01/27690 or Wood article, and comprising an electrochromically-active layer comprising a nano-porous-nano-crystalline film comprising a semiconducting metal oxide having an electroactive compound which is either a p-type or n-type redox promoter or p-type or n-type redox chromophore adsorbed thereon or otherwise attached thereto. The display of the present invention has a solid charge transport layer disposed adjacent the film and in charge transport relationship therewith. In one form of this display, the charge transport layer is interrupted between adjacent pixels of the display.

The first aspect of the present invention also provides an electrochromic display, of the type described in the aforementioned U.S. Pat. No. 6,301,038, WO 01/27690 or Wood article, and comprising a nano-porous-nano-crystalline film comprising a semiconducting metal oxide having an electroactive compound which is either a p-type or n-type redox promoter or p-type or n-type redox chromophore adsorbed thereon or otherwise attached thereto, the display having a charge transport material bonded to the promoter or chromophore.

The second aspect of the present invention provides an electrochromic display, of the type described in the aforementioned U.S. Pat. No. 6,301,038, WO 01/27690 or Wood article, and comprising a nano-porous-nano-crystalline film comprising a semiconducting metal oxide having an electroactive compound which is either a p-type or n-type redox promoter or p-type or n-type redox chromophore adsorbed thereon or otherwise attached thereto, the display having a light-scattering material dispersed in the electrolyte. This light-scattering material is conveniently titania.

The second aspect of the present invention also provides an electrochromic display of this type having a light-scattering material disposed over the metal oxide layer and on the opposed side of this layer from the substrate carrying the metal oxide layer.

The second aspect of the present invention also provides an electrochromic display of this type having optical gaps of about 0.2 to about 0.4 μm in diameter in the electrochromically-active layer.

The second aspect of the present invention also provides a method for preparing such an electrochromic display having such gaps, this method comprising admixing particles of the conducting metal oxide with sacrificial particles, coating the mixture of the metal oxide particles and the sacrificial particles on to a substrate to form a layer of the mixed particles and thereafter removing or destroying the sacrificial particles, leaving a layer of the metal oxide particles with the optical gaps therein.

The second aspect of the present invention also provides an electrochromic display of this type having an electrochromically-active layer comprising metal oxide particles coated with a material, preferably silica and/or alumina, capable of being sintered at a temperature below about 400° C.

The second aspect of the present invention also provides a method for preparing such an electrochromic display, this method comprising coating the metal oxide particles with a material capable of being sintered at a temperature below about 400° C., coating a layer of the coated metal oxide particles on a substrate, and thereafter sintering the layer of coated metal oxide particles at a temperature below about 400° C. In a preferred embodiment of this method, the sintering is conducted at a temperature below about 150° C. In another preferred embodiment of this process, the sintering is effected by liquid phase sintering with pressure, preferably using a roll-to-roll drum process; some variants of this preferred embodiment can be carried out at ambient temperature.

The third aspect of the present invention provides an electrochromic display, of the type described in the aforementioned U.S. Pat. No. 6,301,038, WO 01/27690 or Wood article, and comprising a nano-porous-nano-crystalline film comprising a semiconducting metal oxide having an electroactive compound which is either a p-type or n-type redox promoter or p-type or n-type redox chromophore adsorbed thereon or otherwise attached thereto, the display having light sealing means arranged to reduce or eliminate exposure of the electrochromically-active layer to radiation, thereby reducing or eliminating the light degradation of the redox chromophore due to photocatalytic reactions at the electrochromically-active layer.

The third aspect of the present invention also provides an electrochromic display of this type having oxygen sealing and/or removing ("getting") means for providing an oxygen seal and/or for removing oxygen from within the display in order to stop or minimize the degradation of the electrolyte due to exposure of the electrolyte to oxygen.

The third aspect of the present invention also provides an electrochromic display of this type having water sealing and/or removing ("getting") means for providing a water seal and/or for removing water from within the display in order to stop or minimize the degradation of the electrolyte due to exposure of the electrolyte to water.

The third aspect of the present invention also provides an electrochromic display of this type having electrostatic discharge prevention means for protecting against electrostatic discharge that would degrade the electrolyte and/or damage the electrochromically-active layer of the display.

The third aspect of the present invention also provides an electrochromic display of this type having means to isolate each electrochromic pixel from unwanted fields.

The present invention also provides an electrochromic display of this type having means to control the distance between the electrode surfaces of the display to minimize or eliminate high fields, thus removing or reducing the tendency of such high fields to degrade the electrolyte and/or electrochromically-active layer of the display.

The fourth aspect of the present invention provides an electro-optic display comprising:

an electro-optic medium;

at least one electrode arranged to apply an electric field to the electro-optic medium;

drive means for supplying a driving pulse to the electrode;

a temperature sensor for sensing the temperature of, or adjacent to, the electro-optic medium and producing an output signal representative of the temperature; and control means for receiving the output signal from the temperature sensor and controlling the drive means to vary the driving pulse dependent upon the output signal.

The fourth aspect of the present invention also provides an electro-optic display comprising:

an electro-optic medium;

at least one electrode arranged to apply an electric field to the electro-optic medium;

drive means for supplying a driving pulse to the electrode;

a humidity sensor for sensing the humidity of, or adjacent to, the electro-optic medium and producing an output signal representative of the humidity; and control means for receiving the output signal from the humidity sensor and controlling the drive means to vary the driving pulse dependent upon the output signal.

The fourth aspect of the present invention also provides an electro-optic display comprising:

an electro-optic medium;

at least one electrode arranged to apply an electric field to the electro-optic medium;

drive means for supplying a driving pulse to the electrode;

a timer for measuring the operating time of the electro-optic medium and producing an output signal representative of this operating time; and control means for receiving the output signal from the timer and controlling the drive means to vary the driving pulse dependent upon the output signal.

The fourth aspect of the present invention also provides a method of operating an electro-optic display, the display comprising an electro-optic medium and at least one electrode arranged to apply an electric field to the electro-optic medium, the method comprising:

applying a first driving pulse to the electrode;

measuring the optic state of at least one portion of the electro-optic medium after application of the first driving pulse thereto; and applying a second driving pulse to the electrode, the second driving pulse being controlled by the measured optical state of the at least one portion of the electro-optic medium.

The fourth aspect of the present invention also provides a method of operating an electro-optic display, the display comprising an electro-optic medium and at least one electrode arranged to apply an electric field to the electro-optic medium, the method comprising:

applying a first driving pulse to the electrode;

measuring the current passing through the electro-optic medium as a result of the application of the first driving pulse; and applying a second driving pulse to the electrode, the second driving pulse being controlled by the measured current resulting from the first driving pulse.

BRIEF DESCRIPTION OF DRAWINGS

As already mentioned.

Figure 1:
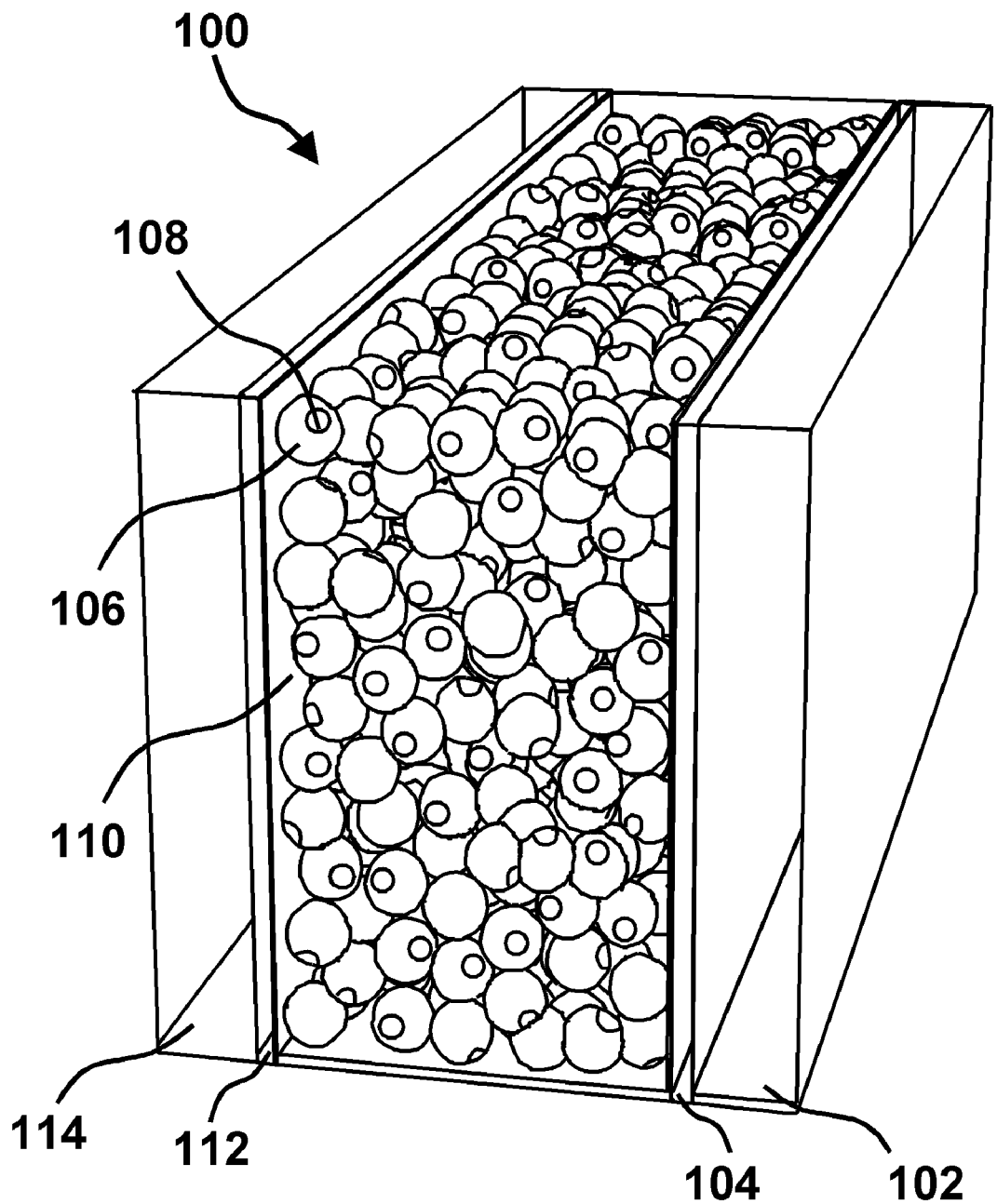
FIG. 1 of the accompanying drawings is a schematic cross-section through a first display of a type described in the aforementioned U.S. Pat. No. 6,301,038.
Figure 2:
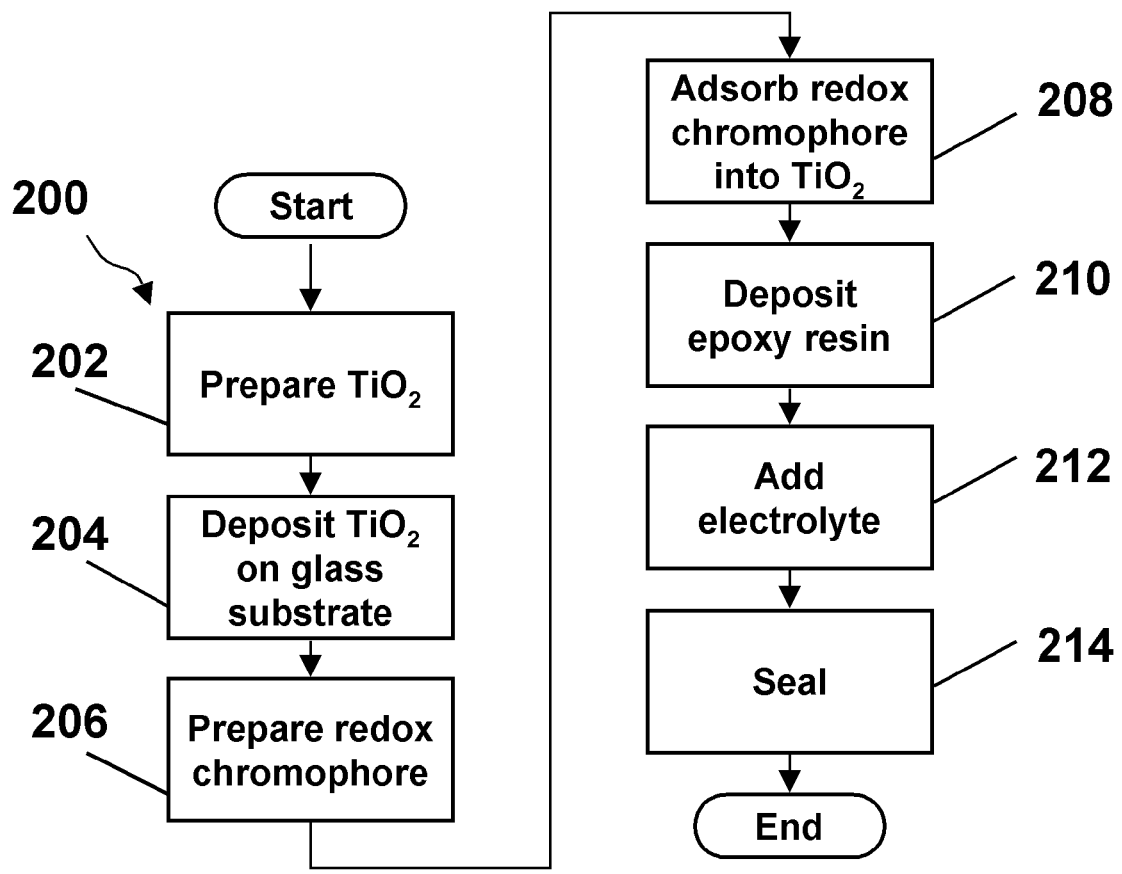
FIG. 2 is a flow chart of a method for preparing the display shown in FIG. 1.
Figure 3A:
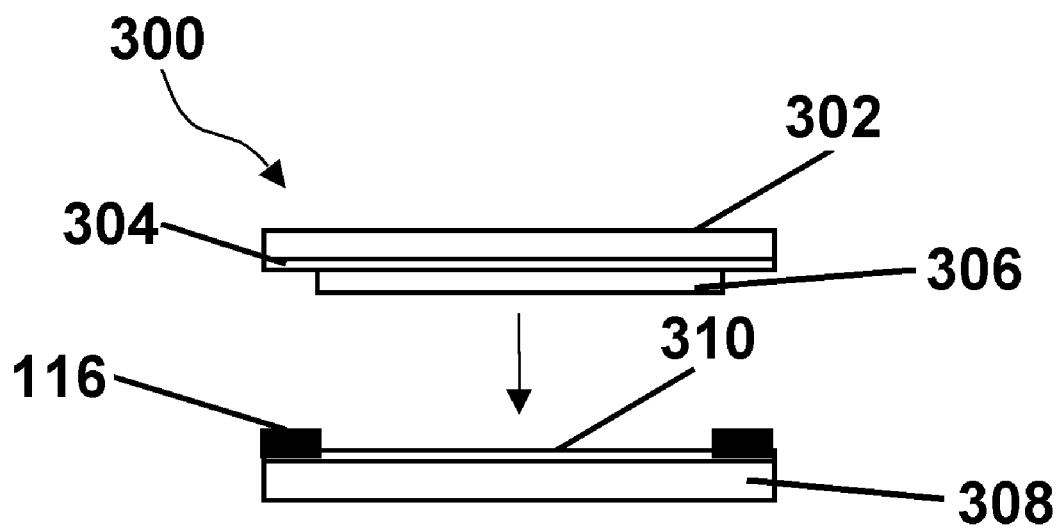
FIG. 3A is a schematic side elevation of an assembly used to form the display shown in FIG. 1.
Figure 3B:
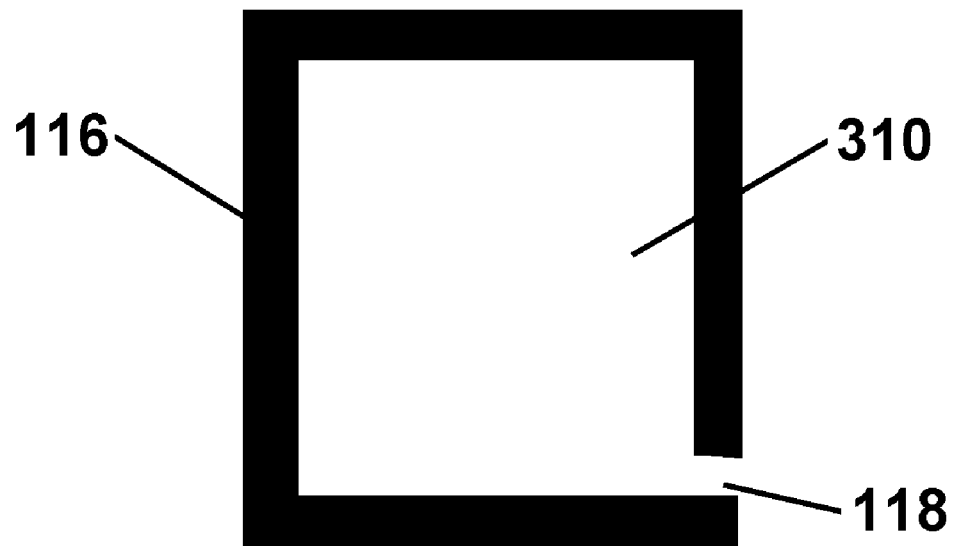
FIG. 3B is a top plan view of part of the assembly shown in FIG. 3A.
Figure 4:
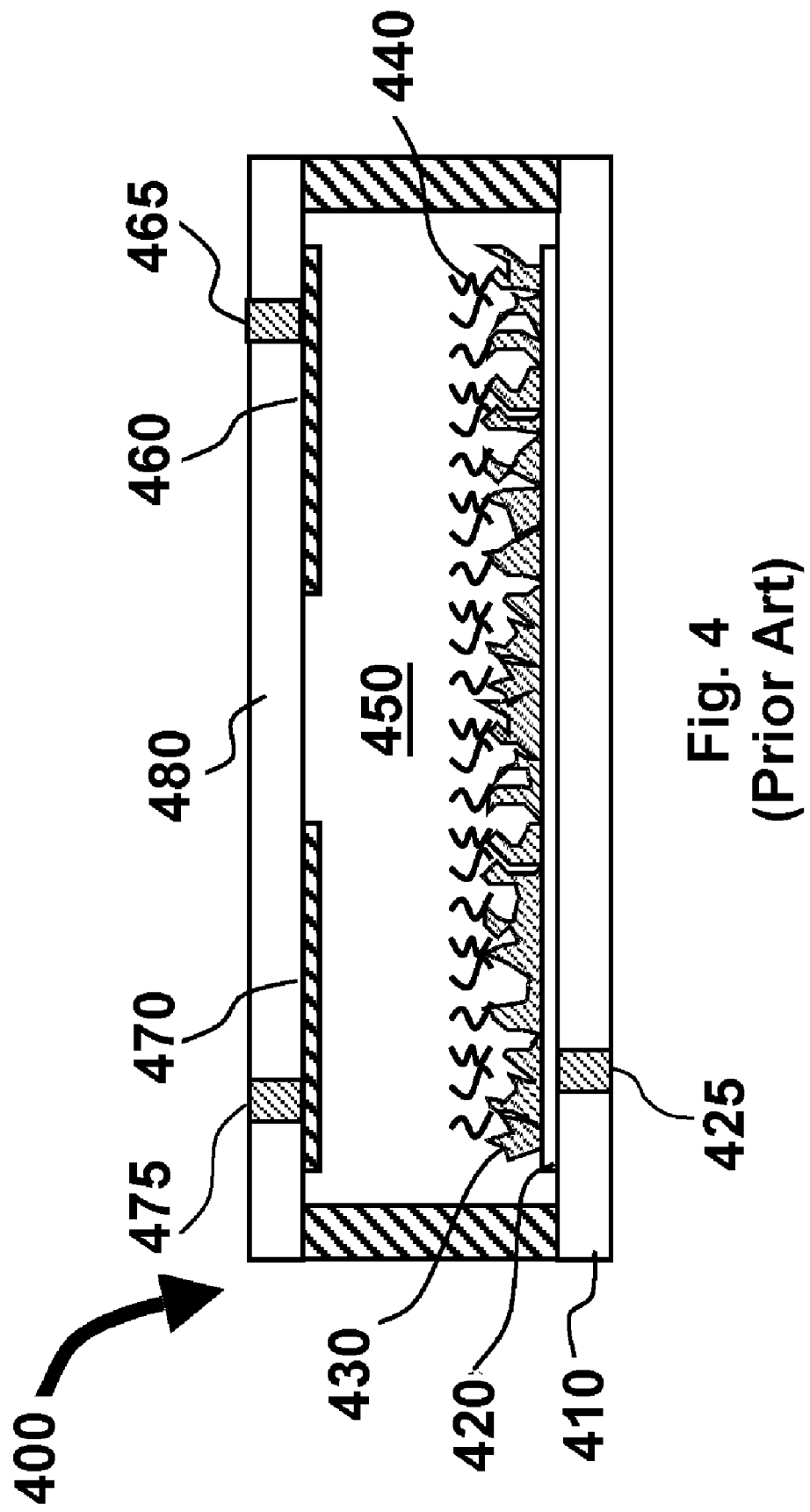
FIG. 4 is a schematic cross-section through one cell of a second display of the type described in the aforementioned U.S. Pat. No. 6,301,038.
Figure 6:
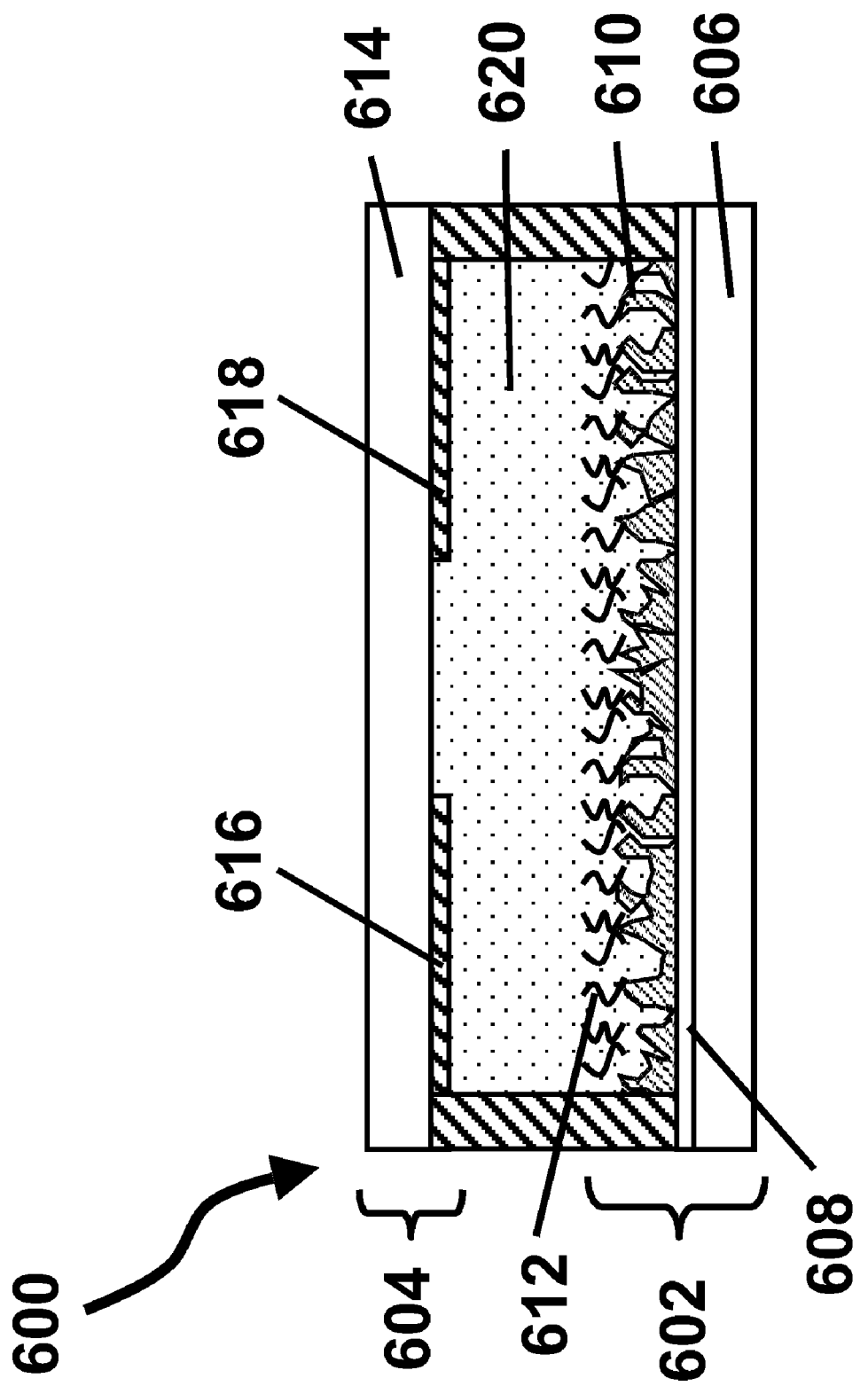
Figure 7:
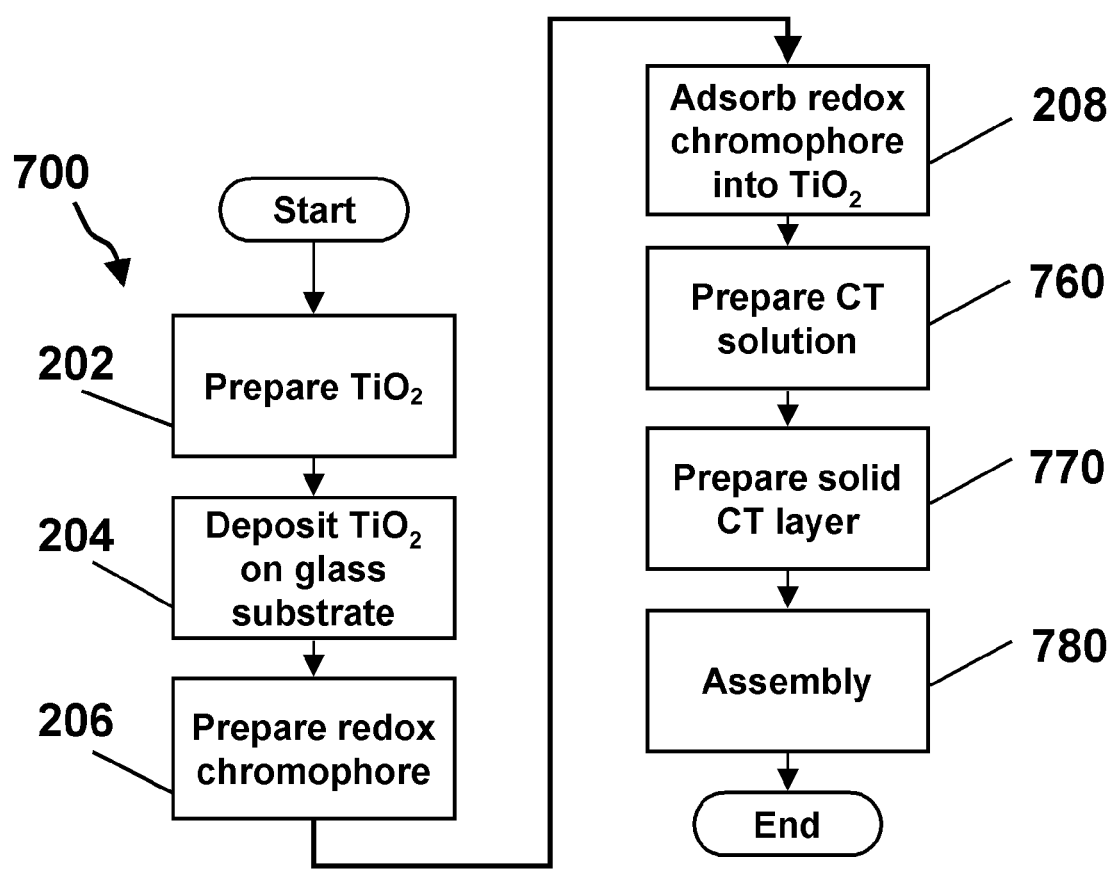
Figure 8:
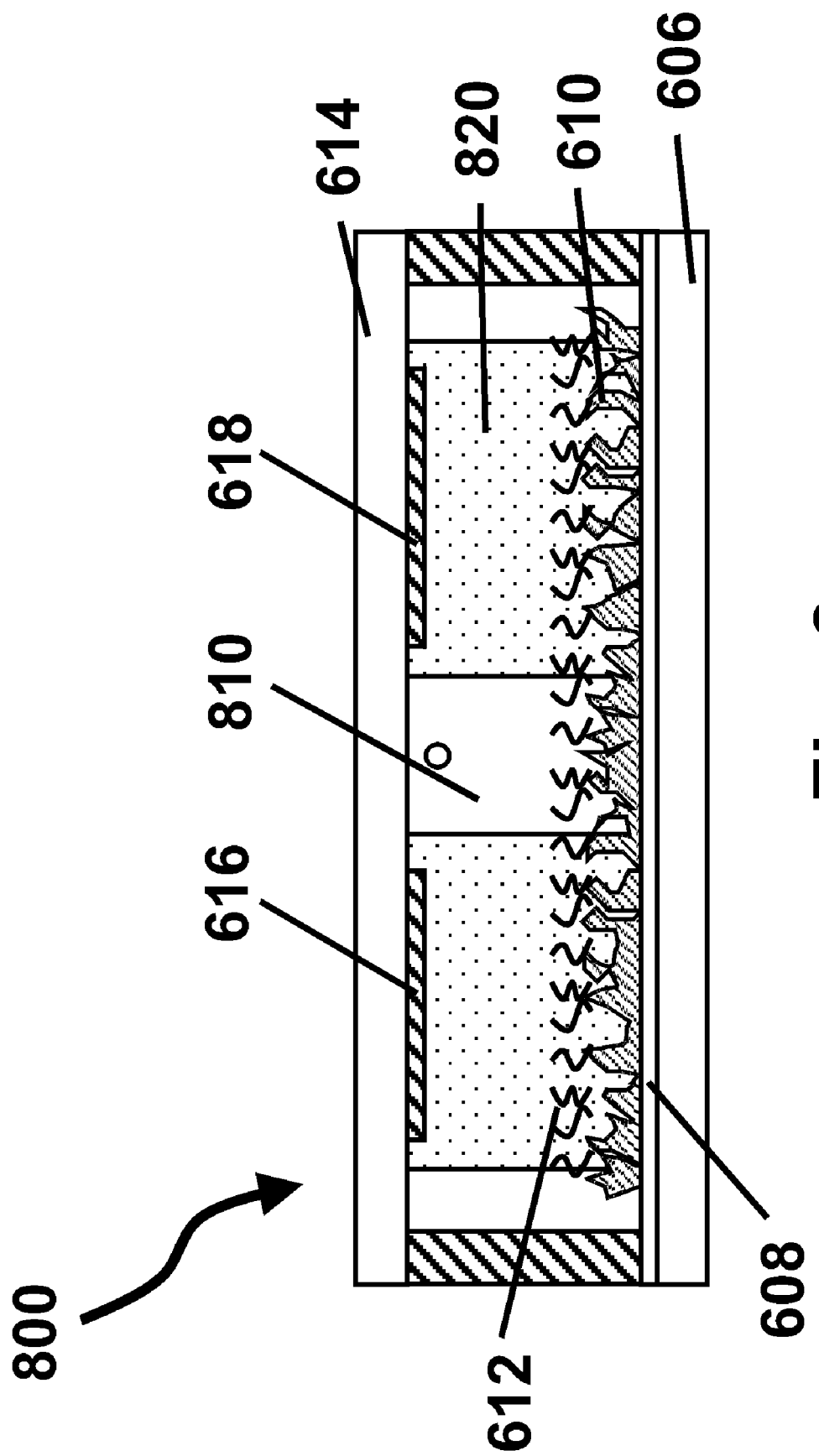
Figure 9:
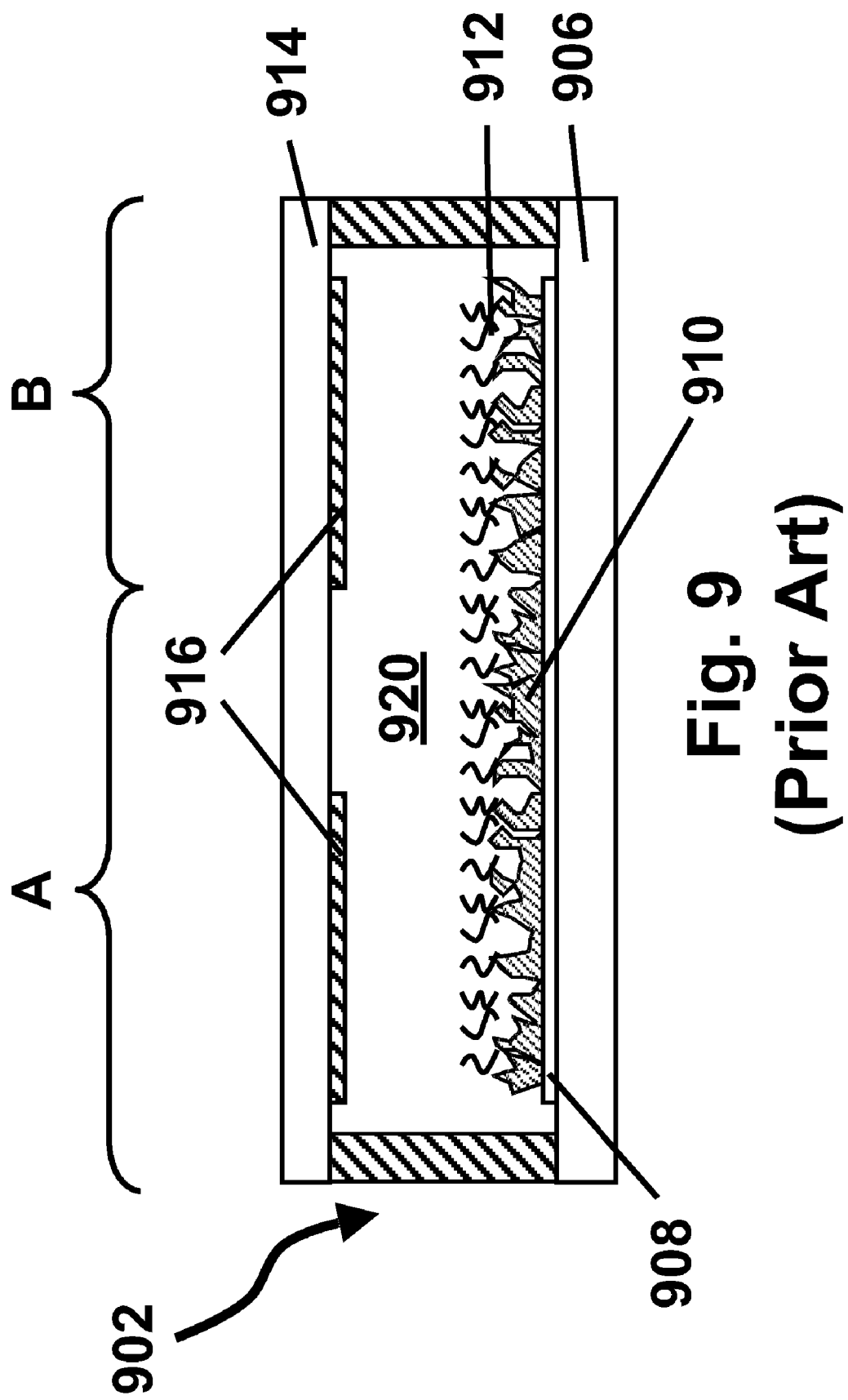
Figure 10:
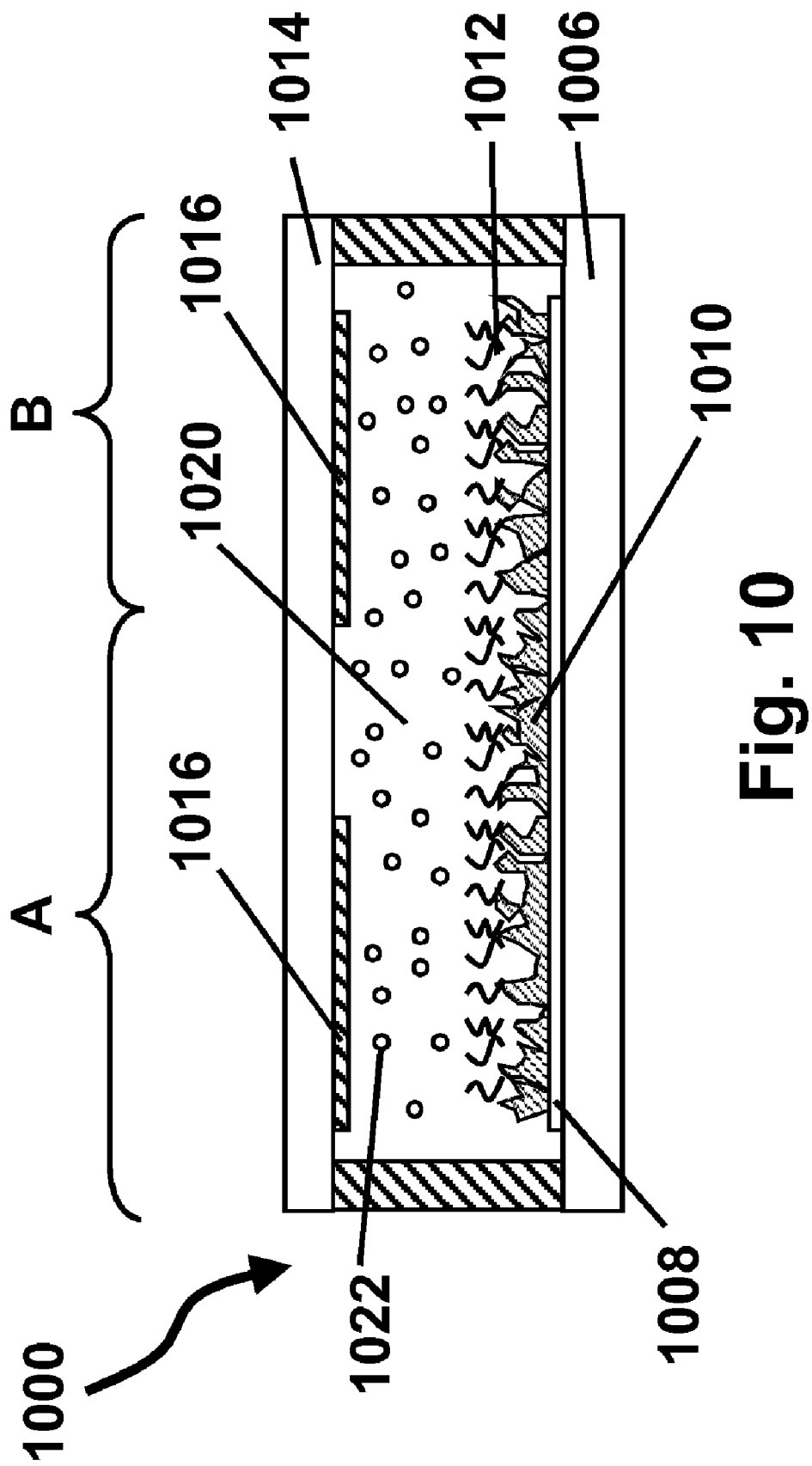
Figure 11:
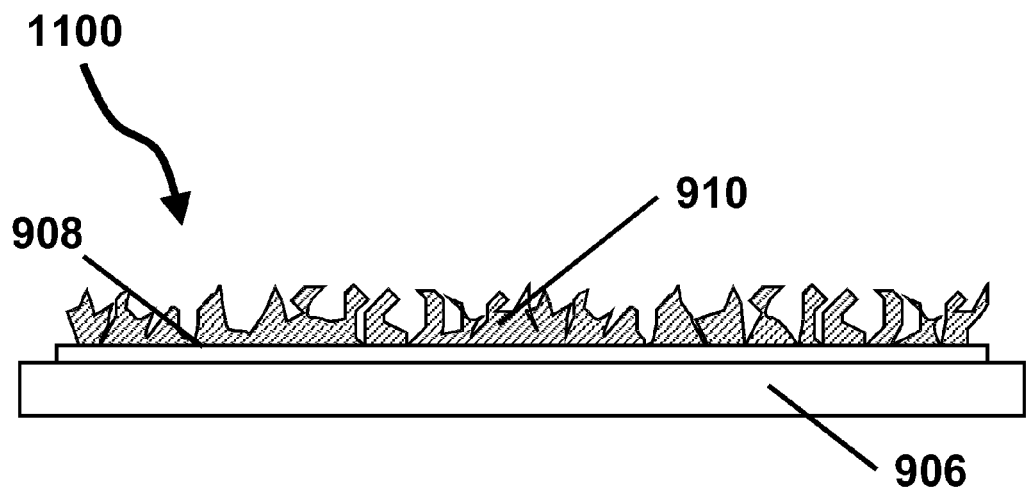
Figure 12:
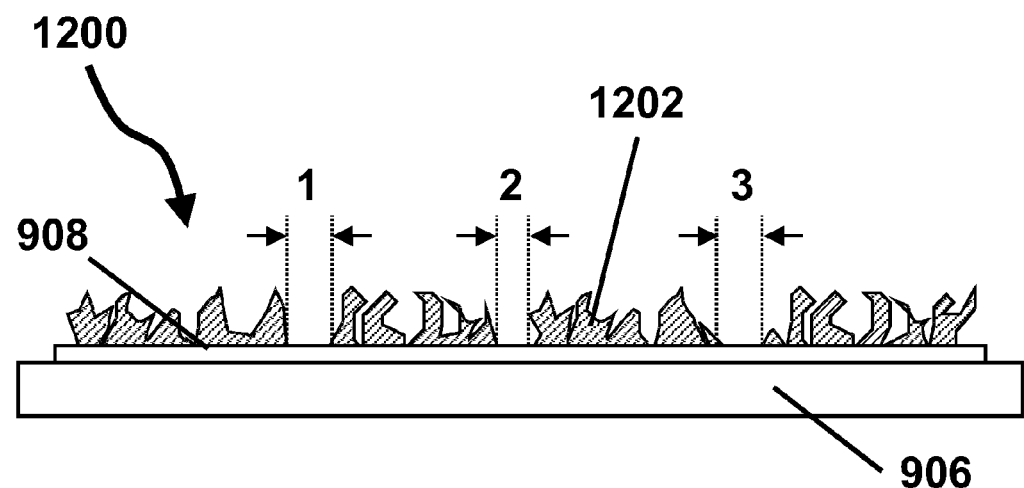
Figure 13:
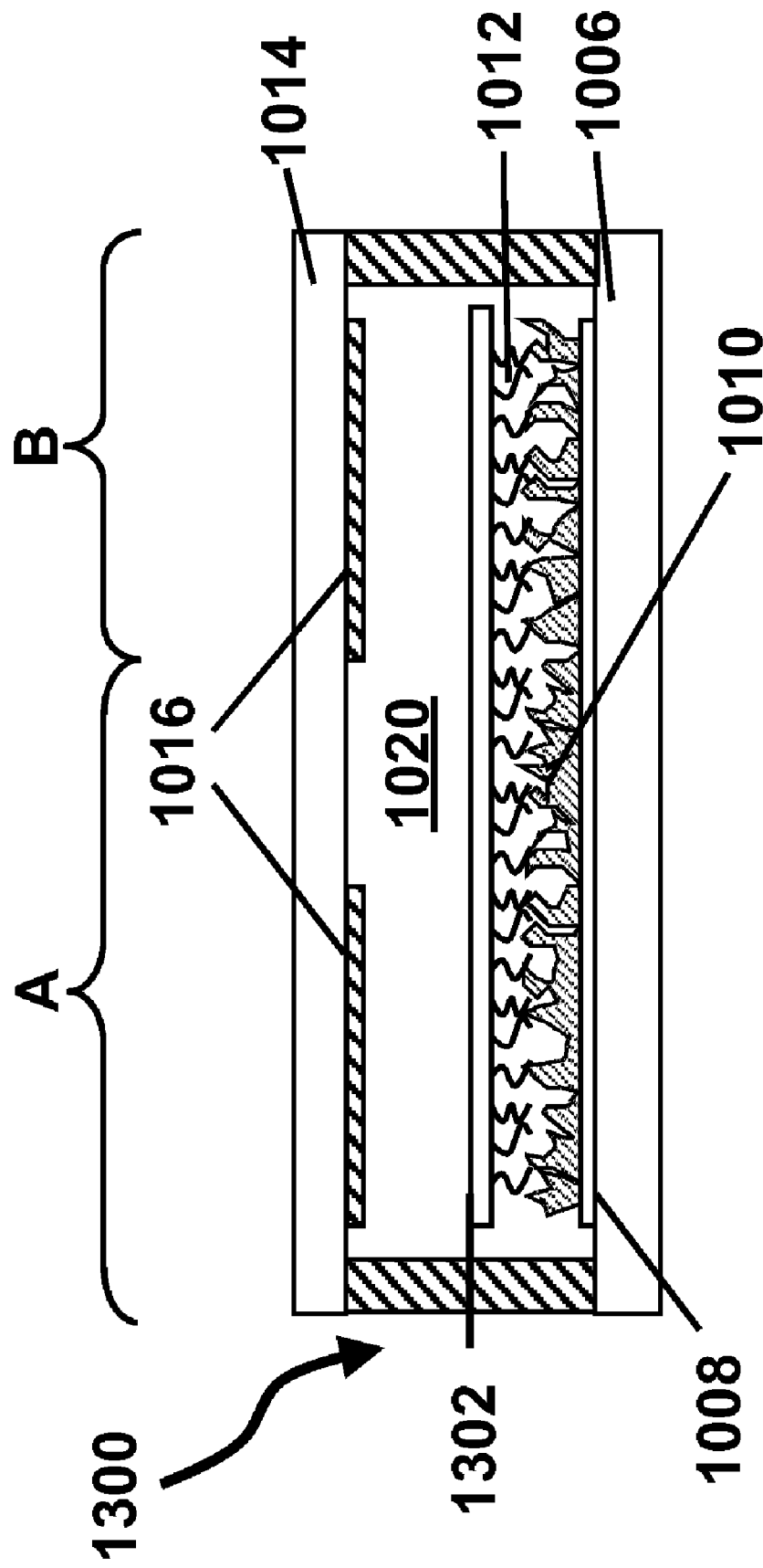
Figure 14A:
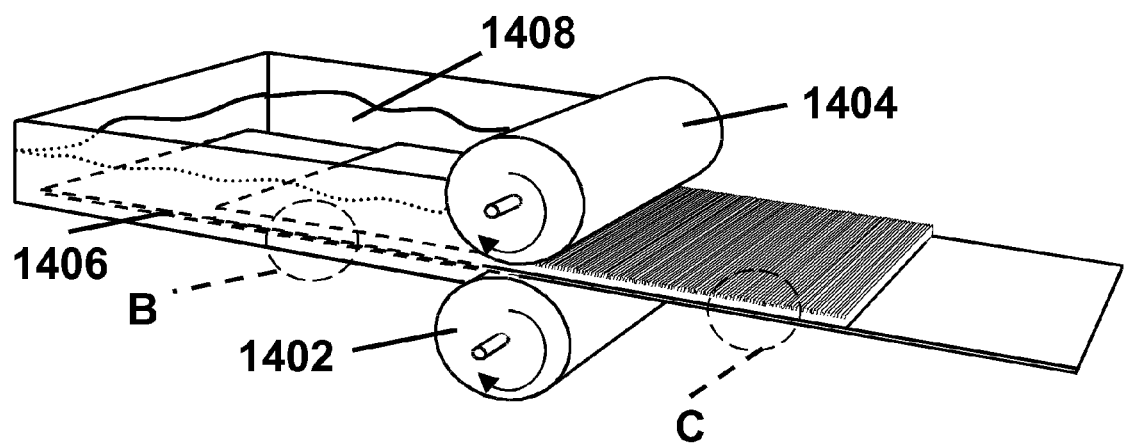
Figure 14B:
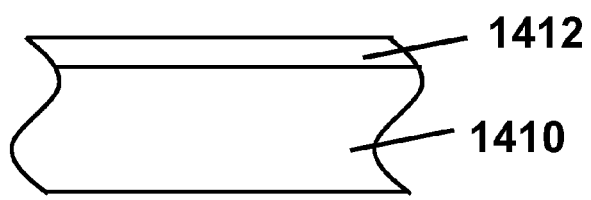
Figure 14C:
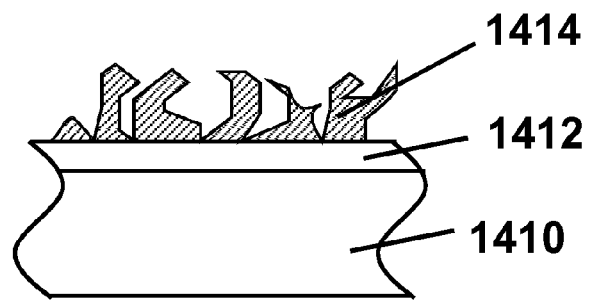
Figure 16:
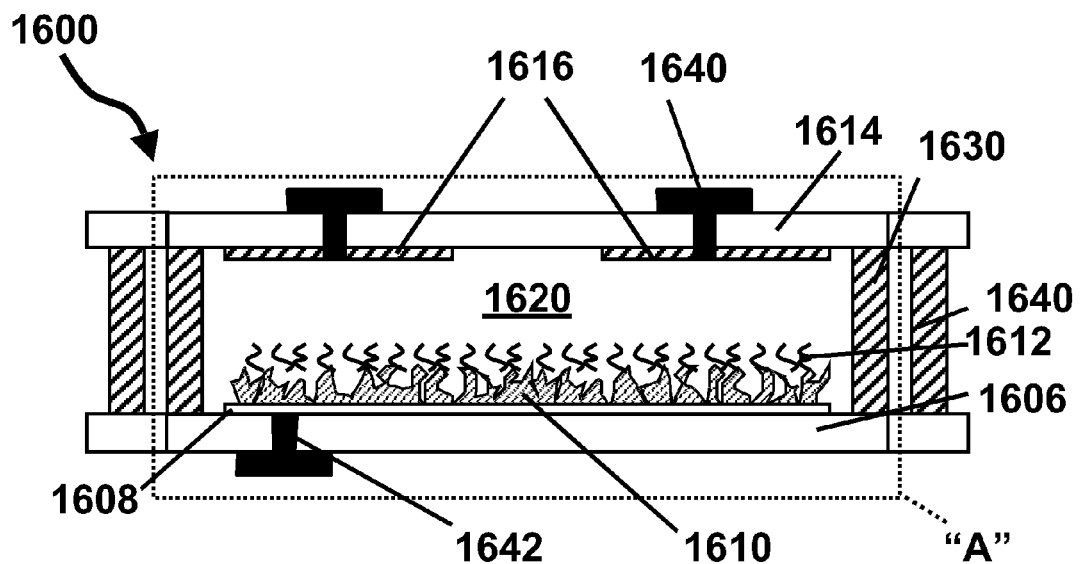
Figure 17:
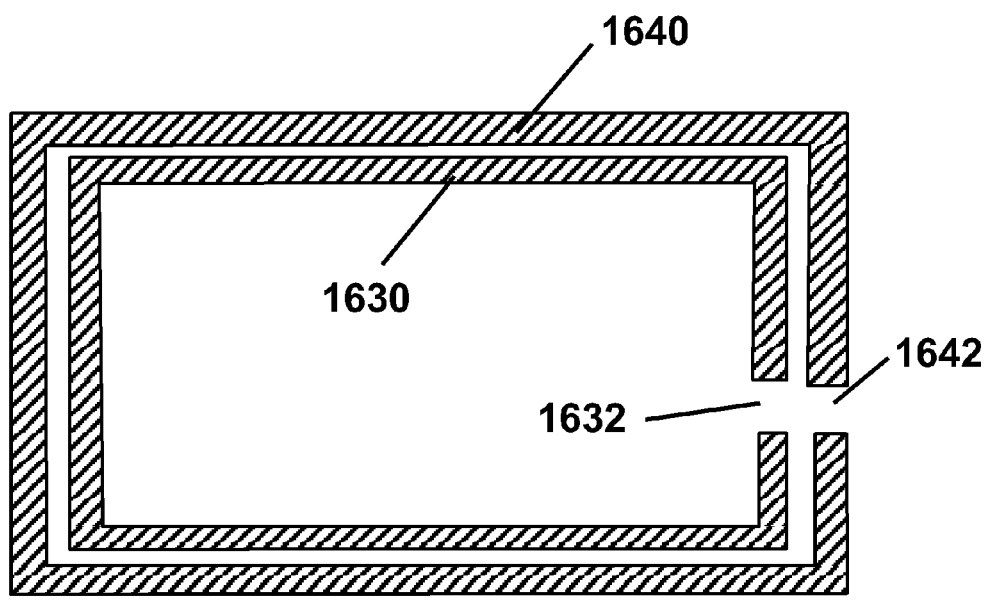
Figure 18:
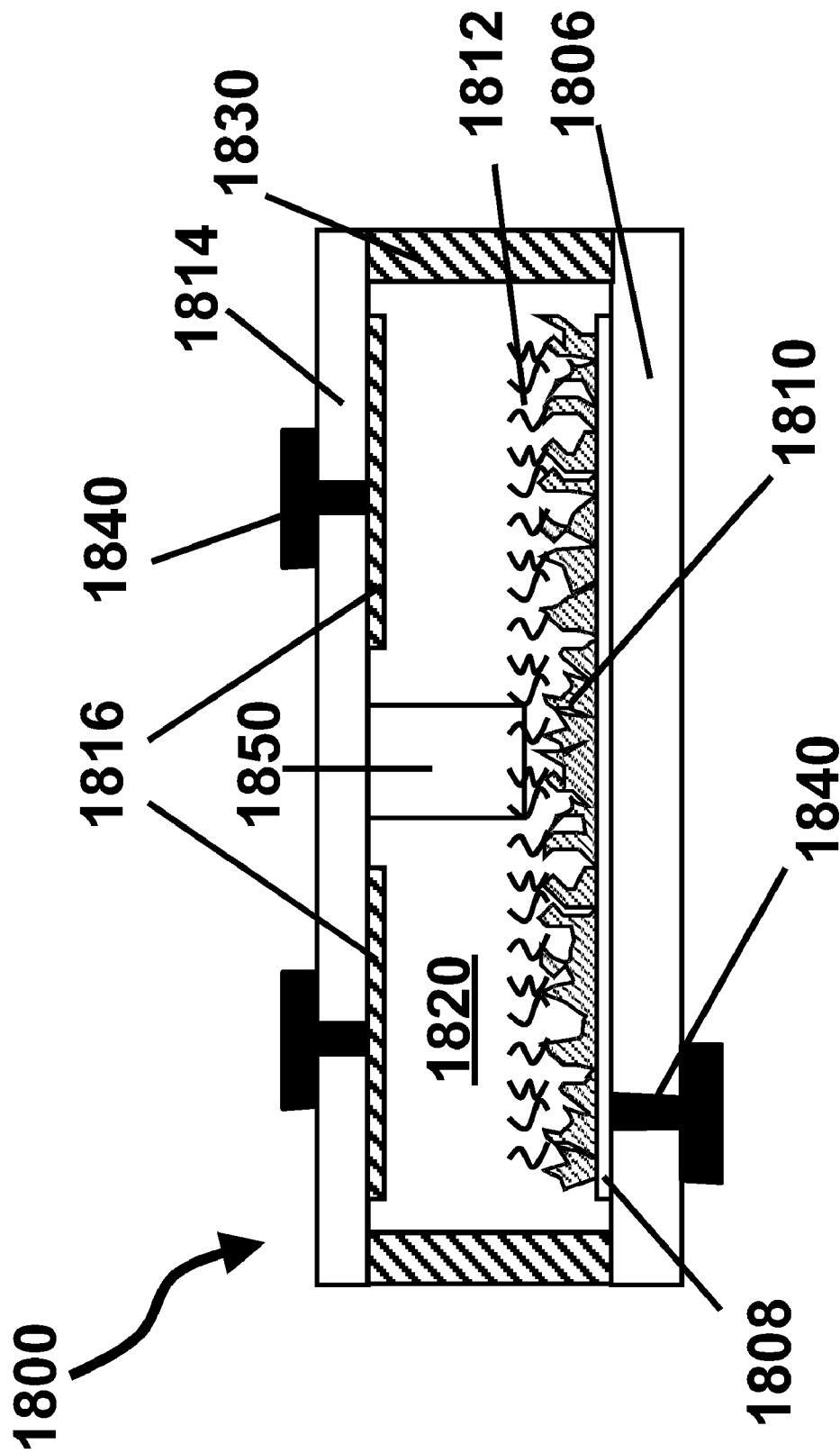
Figure 19:
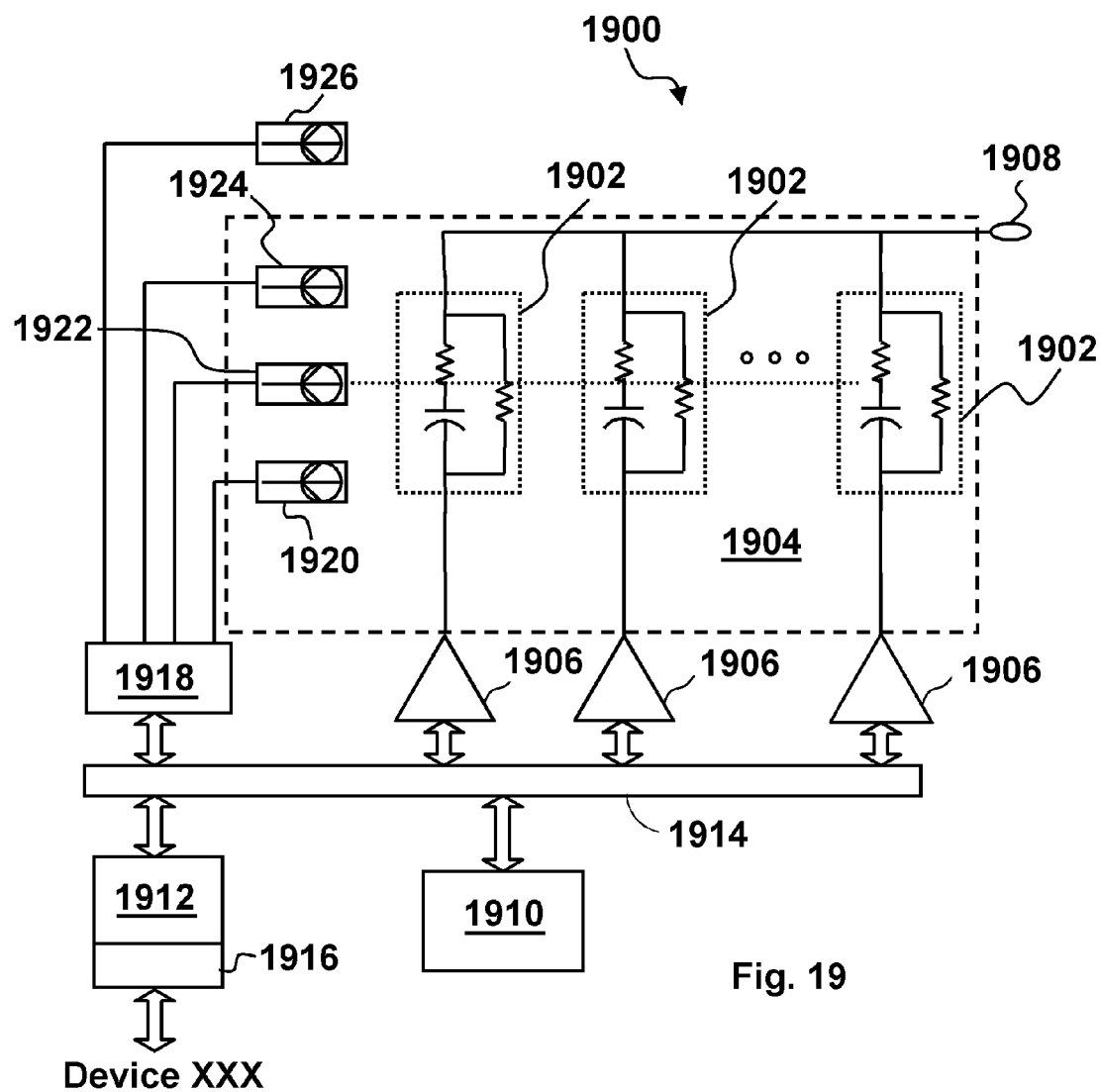
Figure 20:
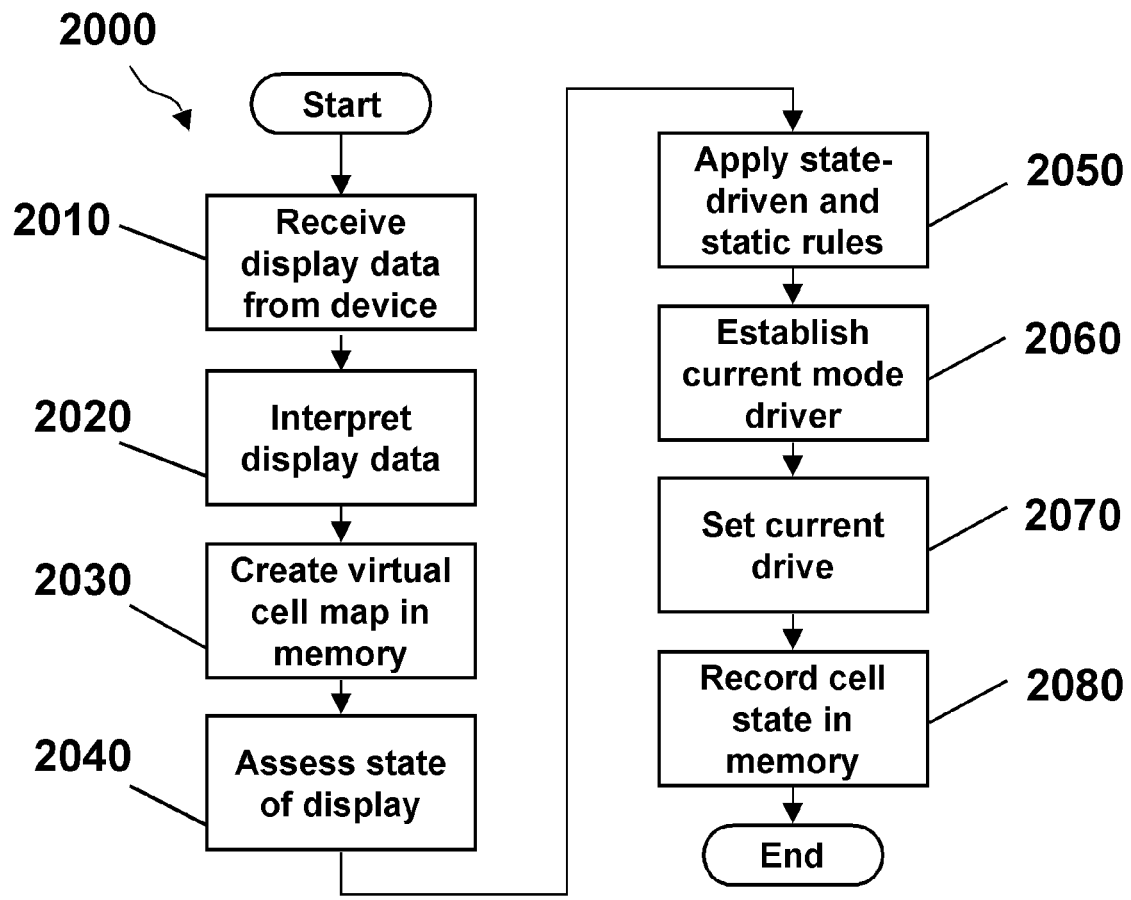
Figure 21:
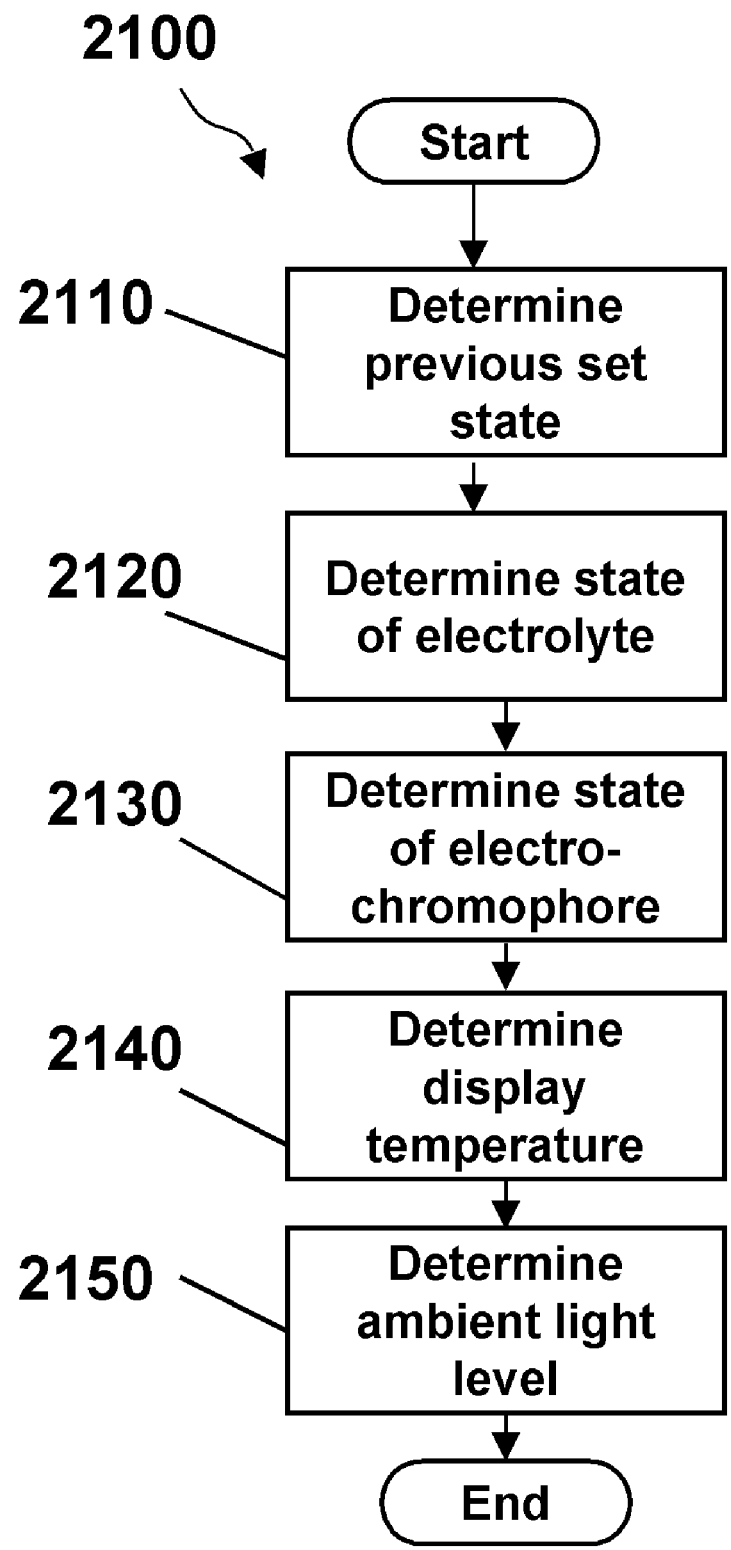
Figure 22:
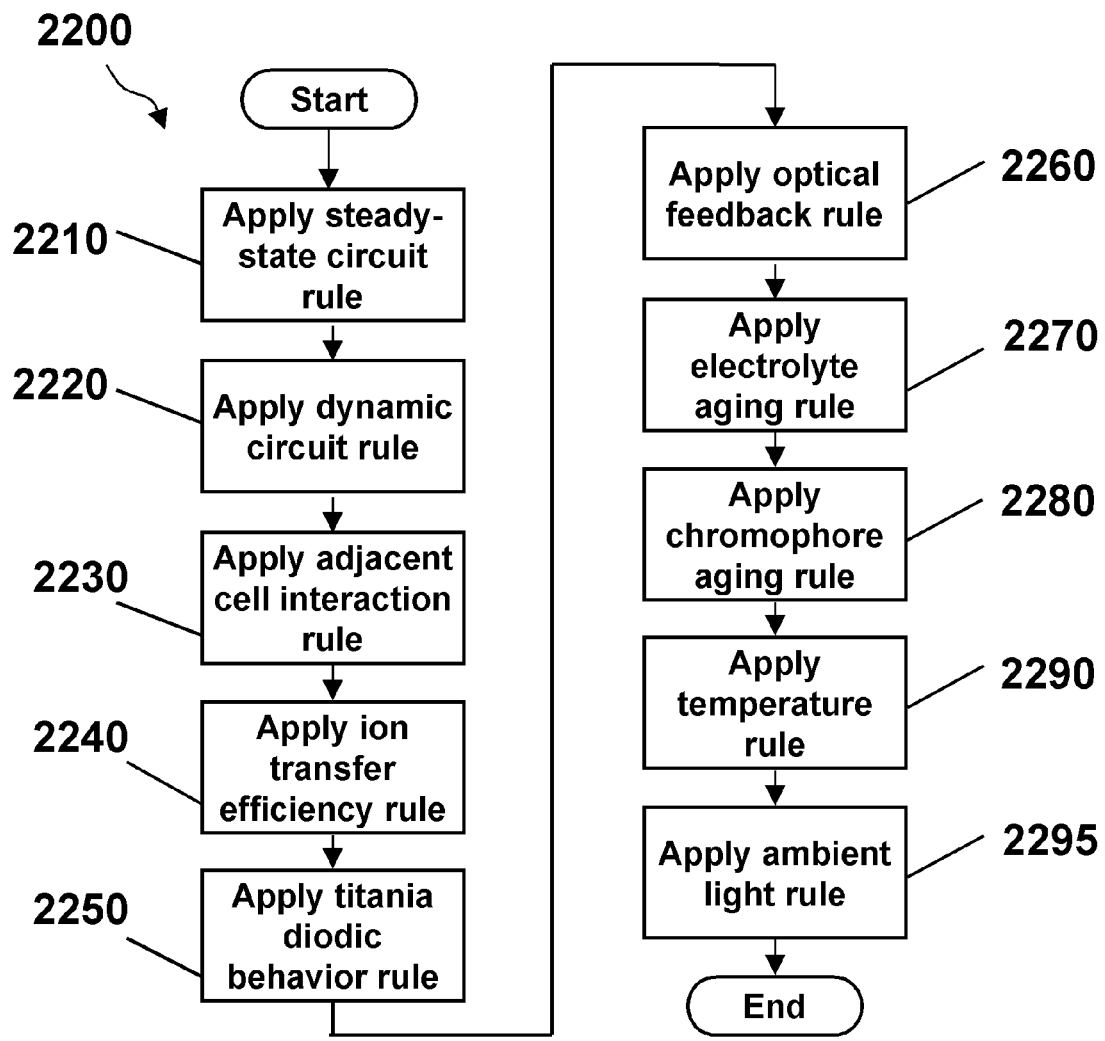
Figure 23:
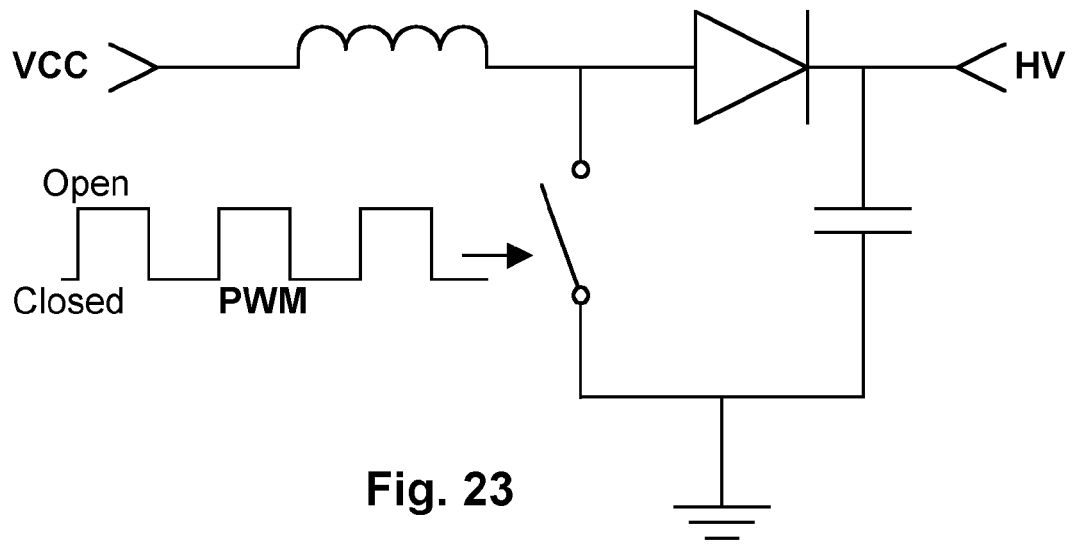
Figure 24:
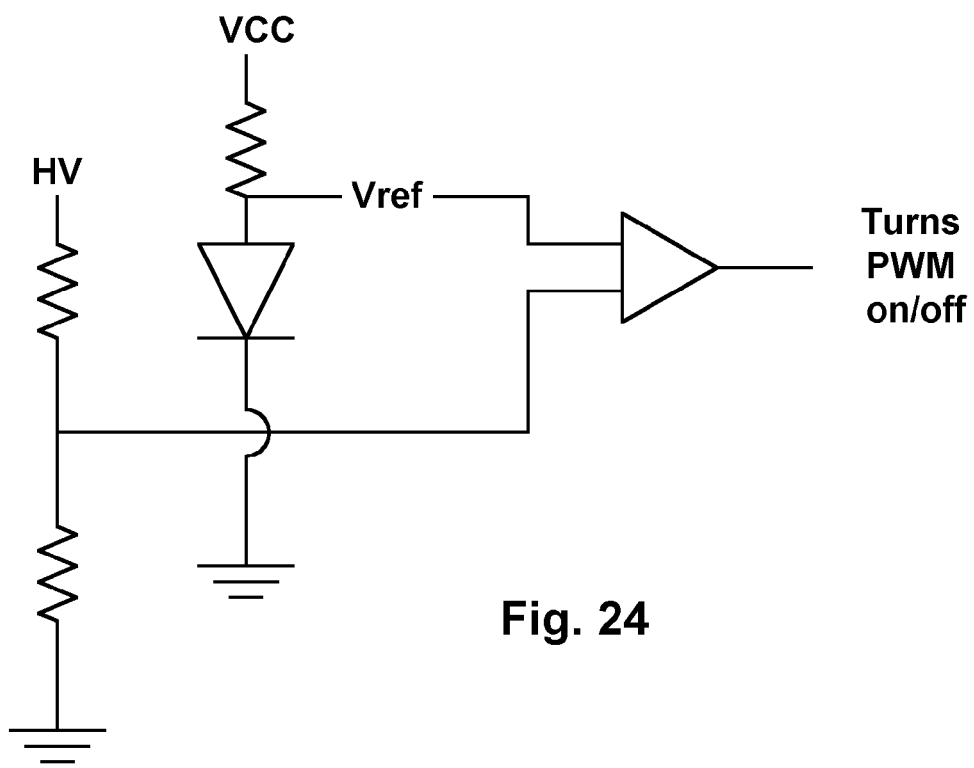

The remaining Figures of the accompanying drawings are as follows:

FIG. 6 is a schematic cross-section, generally similar to that of FIG. 4, through one cell of an electrochromic display in accordance with the first aspect of the present invention and having a solid charge transport layer;

FIG. 7 a flow chart, similar to that of FIG. 2, of a method for preparing the display shown in FIG. 6;

FIG. 8 is a schematic cross-section, generally similar to those of FIGS. 4 and 6, through part of an electrochromic display in accordance with the first aspect of the present invention and having a solid charge transport layer which is interrupted between adjacent pixels;

FIG. 9 is a schematic cross-section, generally similar to those of FIGS. 4, 6 and 8 through one cell of a third display of the type described in the aforementioned U.S. Pat. No. 6,301,038;

FIG. 10 is a schematic cross-section, generally similar to that of FIG. 9, through one cell of a display similar to that shown in FIG. 9 but modified in accordance with the second aspect of the present invention;

FIGS. 11 and 12 are schematic side elevations of nano-porous nano-crystalline titania layers which may be used in displays in accordance with the second aspect of the present invention;

FIG. 13 is a schematic cross-section, generally similar to that of FIG. 10, through one cell of a second display in accordance with the second aspect of the present invention;

FIG. 14A is a three-quarter perspective view of an apparatus for forming nano-porous nano-crystalline titania layers without sintering n accordance with the second aspect of the present invention;

FIG. 14B is a schematic side elevation of the portion of the apparatus within circle B in FIG. 14A;

FIG. 14C is a schematic side elevation of the portion of the apparatus within circle C in FIG. 14A;

FIG. 15 is a schematic cross-section, generally similar to that of FIG. 13, through one cell of a display protected against ultra-violet radiation in accordance with the third aspect of the present invention;

FIG. 16 is a schematic cross-section, generally similar to that of FIG. 13, through one cell of a display protected against moisture in accordance with the third aspect of the present invention;

FIG. 17 is a top plan view, similar to that of FIG. 3B, showing the manner in which the seals of the display shown in FIG. 16 are formed;

FIG. 18 is a schematic cross-section, generally similar to that of FIG. 13, through one cell of a display protected against high internal fields in accordance with the third aspect of the present invention;

FIG. 19 is a block diagram of an electrochromic display and its associated driving circuitry in accordance with the fourth aspect of the present invention;

FIG. 20 is a flow chart of a method for driving an electrochromic display in accordance with the fourth aspect of the present invention;

FIG. 21 is a flow chart of a method for assessing the state of an electrochromic display in accordance with the fourth aspect of the present invention;

FIG. 22 is a flow chart of a method for applying rules for driving an electrochromic display in accordance with the fourth aspect of the present invention; and FIGS. 23 and 24 illustrate circuits used in a temperature-compensated voltage supply for driving an encapsulated electrophoretic display in accordance with the fourth aspect of the present invention.

DETAILED DESCRIPTION

As already mentioned, the present invention has four main aspects, which will be described separately below. However, it will appreciated that the various aspects of this invention may be used singly or in combination. For example, an electrochromic display which makes use of the second aspect of the present invention for improving the contrast of the display may also make use of the third aspect of the present invention for sealing the display from the outside environment, and may also make use of the fourth aspect of the present invention by using a drive scheme which is adjusted to take account of certain environmental parameters.

Section A: Display with Solid Charge Transport Layer

In order to produce a low-cost, high-contrast, faster switching electrochromic display with a process that allows for a flexible display technology, in accordance with first aspect of the present invention, the liquid-based electrolyte used in prior art displays is replaced with a solid charge transport layer. By removing the liquid electrolyte, less concern over sealing the display and ensuring that the electrolyte is uniformly covering the display, is needed. Because of the absence of a liquid electrolyte, manufacturing is simpler and thus cheaper. In addition, because of the presence of the solid charge transport material, the display's switching speed is increased, since the switching speed is no longer limited by the slow movement of ions in the liquid electrolyte.

This aspect of the present invention has three main embodiments. In the first embodiment, liquid electrolyte is replaced by a charge transport layer. In the second embodiment, a charge transport material is bonded to the redox-based promoter or chromophore (e.g. viologen) before the promoter or chromophore is incorporated into the display. The third embodiment may make use of the features of either of the first two embodiments, but the solid charge transport layer is aligned to the display element (pixels) so that each pixel is isolated from adjacent pixels. In all cases, an electrolytic seal to keep a liquid electrolyte confined within the display is not required, thus saving cost and allowing for integration with flexible substrates.

Section A1: First Embodiment—Solid Charge Transport Layer

FIG. 6 shows a schematic cross-section through a display (generally designated 600 having a front section 602 (through which an observer typically views the display 600) and a rear section 604. As in the prior art described above, the front section 602 includes a first glass substrate 606, an ITO conductive layer 608, a titania nano-crystalline layer 610, and a redox chromophore (or promoter) layer (e.g., viologen) 612. The rear section 604 includes a second glass substrate 614, and transparent conductive ITO display elements 616 and 618. Not shown are electrical terminals that attach to the conductive layer 608 and to conductive display elements 616 and 618.

The display 600 further includes, in accordance with the first aspect of the present invention, a solid charge transport layer 620, comprising, for example triphenylamine, which acts in place of the prior art electrolyte between front section 602 and rear section 604, and their respective electrodes, the ITO conductive layer 608 and the display elements 616 and 618. The charge transport layer 620 may be solvent cast by forming a solution of the charge transport material in a solution of a polymer, and the resultant solution coated in a layer, which is typically 5 to 200 μm thick, thinner layers being generally preferred, and the layer finally dried.

FIG. 7 shows a flow chart of a method 700 for forming the electrochromic system shown in FIG. 6. Steps 202-208 in FIG. 7 are identical to those in FIG. 2; the remaining steps are as follows:

Step 760: Preparing Solution of Charge Transport Material

In this step, a charge transport material (e.g., triphenylamine) is dissolved in a suitable organic solvent, such as acetonitrile, toluene or chloroform.

Step 770: Forming Solid Charge Transport Layer

In this step, the solution prepared in Step 760 is coated on the front section 602 by any convenient technique, for example spin coating, dip coating or stencil coating, and dried to produce the final solid layer. The film may alternatively be cast with a dissolved polymer (for example, polystyrene) in the toluene solution to provide better mechanical integrity in the final solid layer.

Step 780: Assembly

In this step, a glue layer bead is added to the edges of either or both of the front section 602 and the rear section 614, and the two sections are assembled by being pressed together. Silicone adhesives may conveniently be used.

It will be understood by those skilled in the art that other charge materials may be used, for example triphenyldiamine, phthalocyanines, metal coordinated phthalocyanines, 4,4',4"-tris(N,N-diphenylamine). A wide variety of charge transport materials are known for use in xerographic copying and the suitability of any of these materials for use in the present invention may readily be determined by routine empirical tests.

Section A2: Second Embodiment: Charge Transport Material Bonded to Promoter or Chromophore In the second embodiment of the first aspect of the present invention, a charge transport material is bonded to the redox promoter or chromophore.

Although other methods of bonding the charge transport material to the redox promoter or chromophore may be used if desired, in a preferred form of the second embodiment, the redox promoter or chromophore is first modified to contain an amino group, if such a group is not already present. The amino-containing promoter or chromophore is then reacted with a charge transport material containing (or modified to contain) an aldehyde, acyl halide or carboxylic acid group to produce a product in which the promoter or chromophore is linked via an amide linkage to the charge transport material.

Alternatively, the promoter or chromophore may be linked to the charge transport material via an ether linkage, for example by a Williamson ether coupling reaction, by the reaction of a hydroxide or thiol, in the presence of base, with an alkyl or aryl halide functional group. Other possibilities include the formation of an amine linkage by the reaction of a primary amino group with an alkyl or aryl halide group. Aryl amines, phenols and any thiols may be reacted with aryl halides in the presence of a metal catalyst, such as a palladium-phosphine based catalyst, to assemble aryl ether, aryl thiol and aryl amine linkages (the Buchwald-Hartwig chemistry). As will be apparent to those skilled in the art, in all cases which reactive group is provided on the charge transport material and which is present on the promoter or chromophore is essentially a matter of synthetic convenience, availability of starting materials, presence of interfering groups on a particular reactant and similar factors which will be familiar to organic synthetic chemists. It will also be understood that there are numerous other ways to bond the charge transport material to the promoter or chromophore.

The charge transport material may be bonded to the promoter or chromophore before this promoter or chromophore is incorporated into the display, or the bonding of the charge transport material to the promoter or chromophore may be effected after the promoter or chromophore has been adsorbed on to the titania. In the latter case, the titania layer could be immersed in an organic solution containing the modified charge transport material and any other reagents (for example, a base) needed for the necessary reaction to occur. Heat might be applied to accelerate the reaction.

The foregoing description assumes that promoter or chromophore will lie between the charge transport material and the titania, i.e., that the structure will be titania-promoter/chromophore-charge transport material. However, at least in some cases, it may be advantageous to insert the charge transport material between the titania and the promoter or chromophore, thus producing the structure titania-charge transport material-promoter/chromophore. To prepare such a structure, the charge transport material and the promoter or chromophore may be linked in any of the ways previously described, but it is necessary to provide the charge transport material with a group which will absorb on the titania, and desirable to modify the promoter or chromophore so that it does not strongly absorb on the titania.

Section A3: Third Embodiment—Define Region in the Solid Charge Transport Layer

As already mentioned, the third embodiment of the first aspect of the present invention relates to the use of defined (separate) regions in a solid charge transport layer, and in particular the use of a solid charge transport layer which is interrupted between adjacent pixels of the display. FIG. 8 shows a display (generally designated 800), which is generally similar to the display 600 shown in FIG. 6; in particular, the display 800 comprises glass substrates 606 and 614, an ITO conductive layer 608, a titania nano-crystalline layer 610, a redox chromophore layer 612 and display elements 616 and 618, all of which are essentially the same as the corresponding elements in the display 600 shown in FIG. 6. The display 800 further comprises a solid charge transport layer 820, which is generally similar to the corresponding charge transport layer 620 shown in FIG. 6, but which differs therefrom by being interrupted by a gap 810 between display elements 616 and 618; although this is not apparent from FIG. 8, multiple gaps 810 are provided within the charge transport layer 820 so that each pixel of the display (each pixel being defined by a display element such as the elements 616 and 618) is isolated from all adjacent pixels. The gap 810 may be filled with either air or a clear material, typically a polymer, which is free from charge transporting materials (i.e., is an insulator).

The display 800 may be manufactured by a method substantially the same as the method 700 shown in FIG. 7 but with the following additional steps inserted after step 770 and before step 780:

Step 771: Applying Imaging Layer on Solid Charge Transport Layer

In this step, a photo resist or photo-imageable polymer is spin applied on top of the solid layer of charge transport material 820.

Step 772: Defining Image in Imaging Layer

In this step, images are exposed and developed in the photo resist or photo-imageable polymer imaging layer.

Step 773: Defining Aligned Image in Imaging Layer

In this step, images that align with display elements 616 and 618 are exposed and developed in the photo resist or photo-imageable polymer imaging layer.

Step 774: Etching Charge Transport Layer

In this step, charge transport layer 820 is etched using a wet or dry etch technique, depending upon the specific charge transport material used, patterning the layer 820 and leaving gap 810.

Step 775: Removing Imaging Layer

In this step, the photo resist or photo-imageable polymer imaging layer is removed using an organic solvent which dissolves the photo resist or photo-imageable polymer but not the charge transport material. Alternatively, the photo resist or photo-imageable polymer could be removed by dry etching to expose the charge transport layer 820.

Step 776: Fill Gaps

In this optional step, gap 810 is filled with any suitable insulator.

It will be appreciated that the first aspect (and indeed the other aspects) of the present invention may make use of any of the materials, processes and techniques described in the aforementioned U.S. Pat. No. 6,301,038, WO 01/27690 and Wood article, provided of course that the materials are compatible with the use of solid charge transport layers. In this connection, it is noted that many of the preferred electroactive compounds described in WO 01/27690 for use in nano-porous, nano-crystalline films are already provided with carboxylic acid groups, which can be used to link these electroactive compounds to charge transport materials by the chemistry already described.

Section B : Display with Improved Contrast and Readability

As already mentioned, the second aspect of the present invention relates to improvements over the prior art in terms of enhanced contrast and, hence, readability for the user. This aspect of the invention provides structures for and methods of making high-contrast, low-cost electrochromic displays.

In one form of the second aspect of the present invention, as already mentioned, a light-scattering material, such as titania, is added to the electrolyte of the display. The light-scattering material enhances the contrast of the display by making off regions of the display a whiter and/or more consistently whiter color.

In another form of the second aspect of the present invention, as already mentioned, physical gaps are created in the electrochromically-active layer by using a sacrificial spacer particle such as polystyrene, latex or silica particles to alter the microstructure (i.e., the structure on the micro scale) of the nano-structured film. The physical gaps enhance the contrast of the off regions of the display by scattering light of the wavelength that makes the background whiter. The gaps leads to better absorption and re-emission of light, which further enhances the display contrast.

In another form of the second aspect of the present invention, as already mentioned, a layer of a light-scattering material, preferably titania, is provided on the opposed surface of the electrochromically-active layer from the substrate carrying this active layer, so that the light-scattering material lies behind the active layer as seen by an observer. This layer of light-scattering material further enhances the display contrast.

In addition, the second aspect of the present invention provides an improvement of the art in terms of lowering the cost and temperature of the manufacturing process, so that more applications are possible, e.g. flexible displays that use plastic-based substrates. This aspect of the invention provides a structure for and method of making a low-cost and low-temperature electrochromic display device. In one embodiment, the nano-crystalline film is created with titania or similar particles coated with a layer of a material which can be sintered at low temperatures to provide a simplified lowered temperature process.

These various improvements provided by the second aspect of present invention can be used singly or in any combination to enhance the contrast of the display.

Section B1. First Embodiment—Improving Electrolyte Contrast

The preferred electrolyte used in the prior art electrochromic displays discussed above is optimized for its ion transport properties, but is not optimized for contrast against the activated redox chromophore (a chromophore that has accepted an electron through a redox reaction and has undergone a color change). As more ion transport occurs through the electrolyte in the regions where electrons are available, more redox chromophore is activated. Thus, the electrochromic display contrast is limited to electron availability (ion transport) only and the redox chromophore, against a non-optimized electrolyte background (i.e., in regions where the electrolyte is not activated), is not optimized for its optical properties for background light reflection.

FIG. 9 is a simplified view of a prior art electrochromic display (generally designated 900) comprising a first glass substrate 906, a first fluorine-doped, tin-oxide-coated conductive layer 908, a nano-structured titania film 910, a redox chromophore 912, an electrolyte solution 920 (also known as electron donor solution), one or more conductive elements 916, and a second glass substrate 914.

It is not clear from the descriptions in the aforementioned U.S. Pat. No. 6,301,039 and WO 01/27690 which is intended to the viewing surface of the display, nor is it clear whether the display is intended to be viewed in transmission or reflection. However, according to the aforementioned Wood article, in the presently-preferred display the substrate carrying the electrochromically-active layer provides the viewing surface (i.e., the display is viewed from below in FIG. 9), and this layer is viewed in against a background provided by the white reflective titania coating on the opposed "rear" electrode, so that the display operates in a manner rather similar to a reflective LCD, in that the optically-active layer is transmissive, but a reflector provided on the opposed side of the optically-active layer from the observer, so that the observer views the display in a reflective mode. Where the reflective layer is placed will affect the contrast of the display. Open spaces in the micro-structured film will improve its optical properties by keeping light in the layer for multiple scattering events; the improvement achieved is similar to the difference between the color achieved by a color filter and a layer of paint.

When viewing electrochromic display 900, regardless of whether or not a reflective layer mentioned in the Wood article is provided on the second glass substrate 914, poor contrast may exist between region A and region B, because the viewer must look through electrolyte solution 920.

In order to improve the contrast of the display, titania particles may be dispersed within the electrolyte solution 920, and a display modified in this manner is illustrated in FIG. 10.

FIG. 10 shows an electrochromic display (generally designated 1000) comprising a first glass substrate 1006, a conductive layer 1008, a nano-structured titania film 1010, a redox chromophore 1012, an electrolyte solution 1020, conductive elements 1016, and a second glass substrate 1014, all of which are essentially identical to the corresponding integers described above with reference to FIG. 9. A plurality of titania particles 1022 are dispersed throughout the electrolyte solution 1020.

Titania particles 1022 are 100-500 nanometer particles added to the electrolyte solution 1020 in an amount enough such that these particles, if dried over a surface, would create a 0.5 µm to 1 µm thick film. Titania particles 1022 in this amount are added to electrolyte solution 1020 before electrolyte solution 1020 is filled into electrochromic display 1000. Titania particles 1022 enhance the contrast between region A and activated region B because an electrolyte solution 1020 with titania particles 1022 reflects more light and appear whiter than the electrolyte solution 920 (FIG. 9) without titania particles.

In order to improve the dispersion of titania particles 1022 within electrolyte solution 1020, a dispersive agent may be added to the mixture of electrolyte solution 1020 and titania particles 1022. The dispersive agent can be an ionic surfactant such as sodium dodecylsulphate (SDS) or non-ionic surfactant such as Triton-X100. The dispersive agent could also be an organic solvent such as acetonitrile.

Another way to improve the dispersion of titania particles 1022 in electrolyte solution 1020 is to coat titania particles 1022 with a thin, 5-10 nm coating of a non-adhering polymer, where the non-adhering polymer coating is slightly charged to ensure that the particles (non-adhering polymer-coated titania) do not stick together. Such polymer coating could be accomplished by dispersing the titania in a aqueous solution of a poly-ionomer or polyelectrolyte such as poly(styrene-sulfonic acid sodium salt), or a copolymer. An example of an appropriate copolymer would be a co-polymer formed from acrylic acid (sodium salt) and acrylic or poly(acrylic acid (sodium salt)-co-acrylamide). The titania particles could also be polymer-coated and/or charged by any of the methods described in the aforementioned 2002/0185378.

Another way to enhance the contrast of electrolyte solution 1020 is to use both polymer-coated titania particles 1022 and an added dispersive agent.

White or light-colored particles other than titania may of course be used. For example, barium sulfate particles, kaolin (clay particles), or lead oxide particles could be used instead of titania particles 1022.

Still another way to improve the contrast of electrolyte solution 1022 is to add to electrolyte solution 1020 particles of a color that enhances the contrast relative to the color of the activated chromophore. For instance, if the chromophore transmits blue, it is better to add white particles than blue particles to electrolyte solution 1020.

Section B2: Second Embodiment—Enhancing the Contrast of the Surface Roughness by Creating Gaps In the second embodiment of the second aspect of the present invention, in order to improve the contrast between the activated regions and non-activated regions of an electrochromic display, the roughness of nano-structured titania film 910 (FIG. 9) is enhanced to absorb and re-emit the wavelength of visible light. The resultant enhanced absorption and re-emission leads to higher contrast regions compared to the activated regions B (FIG. 9).

Typically, in the aforementioned U.S. Pat. No. 6,301,038, WO 01/27690 and Wood article, the nano-structured titania film 910 is 3-4 µm thick with a surface area to unit planar area of 600-1000.

Microscopically, as shown in FIG. 11, a nano-structured titania film (generally designated 1100) has a very rough, surface and the microstructure comprises connected titania flakes. In order to improve the contrast of film 1100, in accordance with the present invention randomized optical gaps, which are 0.2-0.4, preferably 0.2-0.3 µm, are added in the titania. These optical gaps serve to absorb and re-emit light of the correct wavelength, thereby improving the contrast. Optical gaps in a solid scatter light in the same way as do bubbles in a liquid. Gaps of the same order of magnitude as the wavelengths of visible light act as resonators for the alternating electric and magnetic fields of visible electromagnetic radiation. The resonance of light in these gaps emits light in all directions, and this re-emitted light passes back through the layer generating a deeper color by multiple absorptions. If the nano-structured film has gaps or defects only on the nano-scale (such gaps or defects being too small to act as resonators for light), the light passes through the film only twice at most (in and out). In contrast, if the film has "optical gaps", the light bounces around within the film and so the film has a much greater absorption efficiency.

FIG. 12 is a microscopic view of a nano-structured titania film (generally designated 1200) modified with optical gap 1202, showing regions 1, 2, and 3 as openings that allow for enhanced contrast.

For ease of illustration, FIG. 12 shows the optical gaps as extending completely through the modified film. However, the same optical effect is produced by gaps in the form of voids within the film thickness, and in practice this type of void gap is generally preferred since such voids are readily produced by including a sacrificial spacer particle in the layer and then removing the particle, for example by thermal decomposition or dissolution in a solvent.

The nano-structured titania film 1200 provided with optical gap 1202 may be prepared as follows:

Step 1: Preparing Titania Containing with Sacrificial Spacer Particles.

In this step, a colloidal titania dispersion is prepared by hydrolysis of titanium tetraisopropoxide (titanium tetrachloride could alternatively be used). The average diameter (7 nm) of the initially formed crystallites is increased to 12 nm by autoclaving at 200° C. for 12 hours. Concentrating the autoclaved dispersion to 160 g/l and adding Carbowax20000 (40% wt. equiv. of titania) yields a white viscous solution. The sacrificial spacer particles of polystyrene or latex, in the order of 0.2 to 0.4 µm in diameter, are added to this white viscous sol.

Step 2: Depositing Titania on Oxide-coated Conductive Layer

In this step, a 4 µm thick layer of the above sol is deposited using a screen-printing technique on to the conductive layer 908 provided on the glass substrate 906. The resulting gel-film is dried in air for 1 hour, then sintered at 450° C. for 12 hours. At a temperature as high as 450° C., the sacrificial particles are eliminated (burned off), thereby creating optical gap regions 1, 2, and 3.

There are many other possible ways of creating nano-structured titania films with gap 1202. One possible process is to make the sol from which the titania particles are deposited more dilute, such that as the titania particles are deposited (as in step 2 above), there are optical gaps between the titania regions. Another means to produce gaps is to produce a microcell structure on oxide-coated conductive layer 908.

Section B3: Third Embodiment—Enhancing the Contrast of the Roughened Surface by Backing Another means to enhance the contrast of a nano-structured titania film is by creating a backing behind the nano-structured film, since the film itself is somewhat transmissive in thinner regions and less transmissive in thicker regions. The idea is to include a bright, scattering layer in the device so that there is a large contrast between the on and off states. This scattering layer, similar to a white paint layer, can be included wherever useful, but is preferably provided on the rear surface of the nano-structured titania layer, i.e., on the surface of this titania layer facing the electrolyte. This enables light passing through the nano-structured titania layer to be reflected back through this nano-structure layer with passing through the electrolyte, thus improving the contrast of the display. The scattering layer could be a polymer/particle mixture typically cast from solution, for example a solution in an organic solvent.

FIG. 13 shows an electrochromic display (generally designated 1300) which closely resembles the display 1000 shown in FIG. 10, and, as indicated by the corresponding reference numerals in the two Figures. However, the display 1300 lacks the titania particles 1022 dispersed in the electrolyte 1020 of display 1000, but is instead provided with a reflective titania layer 1302 on the rear surface of the nano-structured titania layer 1010. The reflective titania layer 1302 serves to ensure that, if any light passes through transmissive regions of nano-structured titania film 1010, the reflective titania layer 1302 reflects back this light, thus enhancing the contrast between the activated region B and non-activated region A. (Note that although, for ease of illustration, the layer 1302 is shown in FIG. 13 as a layer of uniform thickness, in practice this layer would normally be deposited upon, and would tend to planarize, the underlying nano-structured layer 1010.)

Section B4: Fourth Embodiment—Low-cost Production Method without Sintering

In order to reduce the cost of making an electrochromic display, it is important to reduce or eliminate the high temperatures and/or time necessary to perform the fusing step, which in the aforementioned U.S. Pat. No. 6,301,038, WO 01/27690, and Wood article, is a 450° C., 12-hour process. An additional benefit to significantly reducing the temperature of the process is that flexible polymer substrates can be used into the lower temperature process.

One method to produce a very low-temperature and high-contrast electrochromic display is to use silica-coated titania particles, which may be prepared by the following process, prior to the coating of the titania particles on the substrate:

Step 1:—Add silica-coated or non-coated titania to water such that the resulting solution contains at least about 20 percent of the titania.

Step 2:—Add base-stabilized sodium silicate (known commercially as "water glass"; this material is stabilized with sodium hydroxide) to the solution from Step 1.

Step 3:—Add a wax (for example, Carbowax) to the solution from Step 2 to create a white viscous gel.

Step 4:—Lower the pH of the solution to about 9-10 using an acid such as sulfuric acid.

Step 5:—Deposit the solution prepared in Step 4 on to the glass substrate.

Step 6:—Heat and dry the resultant film from Step 5 at 95° C. for three hours to fuse the silica-coated titania and remove the wax (heating above 100° C. may be desirable to remove all moisture).

This method may be modified by adding ethanol to the reaction mixture in Step 1, replacing Step 2 by adding tetraethoxysilane to the mixture formed in Step 1, carrying out Step 3 in the same manner as before, replacing Step 4 with a step of adding ammonium hydroxide to raise the pH of the solution to about 9-10, and carrying out Steps 5 and 6 in the same manner as before. See the aforementioned 2002/0185378.

The resulting film is highly porous and comprises a large amount of void space to allow for a high deposition concentration of the chromophore. The final product is a nano-crystalline titania coated and linked by a dense, amorphous layer of silica.

Another method to apply the silica-coated titania particles to the substrate is through liquid phase sintering with pressure, whereby the viscous sol created as described above is deposited using a roll-to-roll drum process, with the pressure of the drums creating the heat to bond the silica-coated titania particles to the conducting glass substrate.

A further method of coating the nano-structured titania film is to deposit alumina by sputter deposition after a 24-hour fusing cure (1000 Å). Alumina can also be deposited from solution using aluminum sulfate and sulfuric acid in dilute aqueous solution. The aluminum sulfate can be admixed with sodium silicate to permit co-deposition of alumina and silica.

A further method of coating the nano-structured titania film is to sputter, to deposit using low-temperature chemical vapor deposition, or to spin apply (SOG or "spin on glass") silica on the titania to a coating thickness of about 1000 Å (100 nm).

FIG. 14A shows a roll-to-roll drum process using of a first drum 1402, a second drum 1404, and a web 1406 processing a slurry 1408 of the viscous titania sol created as described above.

FIG. 14B, which is an enlarged view of the area within circle B in FIG. 14A, shows a detailed view of the web 1406, which consists of a first glass substrate 1410, and a conductive layer 1412.

FIG. 14C, which is an enlarged view of the area within circle C in FIG. 14A, shows a detailed view of the coated web, which carries a plurality of silica-coated titania particles 1414. These silica-coated titania particles 1414 on conductive layer 1412 are formed by applying pressure using the first drum 1402 and the second drum 1404.

It will be appreciated by those skilled in electro-optic display technology that any of the embodiments of the second aspect of the present invention can be used singly or together, and may also, as already mentioned, by combined with the other aspects of the present invention. Thus, titania in the electrolyte solution can be used with any type of nano-crystalline substrate. Any nano-crystalline substrate can have optical gaps, and any gap structure can have a thick titania backing. In addition, any of the means to produce low-cost, flexible integrated displays can be used in combination with the enhanced contrast displays.

Displays in accordance with the second aspect of the present invention may make use of any of the electrolytes (and other materials, processes and techniques) described in the aforementioned U.S. Pat. No. 6,301,038, WO 01/27690 and Wood article. Thus, preferred electrolytes comprise at least one electrochemically inert salt optionally in molten form in solution in a solvent. Examples of suitable salts include hexafluorophosphate, bis-trifluoromethanesulfonate, bis-trifluoromethylsulfonylamidure, tetraalkylammonium, dialkyl-1,3-imidazolium and lithium perchlorate.

Examples of suitable molten salts include trifluoromethanesulfonates and bis-trifluoromethylsulfonylamidures. 1-Propyl-dimethyl imidazolium bis-trifluoro and lithium perchlorate are particularly preferred.

Section C: Display with Reduced Susceptibility to Environmental Factors

As already mentioned, a third aspect of the present invention relates to reducing the susceptibility of electrochromic displays to environmental factors. Among such factors against which it is desirable to protect electrochromic displays are various types of electromagnetic radiation, especially ultraviolet radiation, moisture, oxygen (typically, of course, atmospheric oxygen) and high electrostatic fields, both external and internal. Obviously, any given electrochromic display may require protection against more than one of these factors, depending upon the specific materials used in the display and the environment in which the display is being used; for example, a display used within a retail store may not be exposed to large amounts of ultra-violet radiation and hence may not need elaborate protection against such radiation, whereas a display exposed to full sunlight may need much more elaborate protection. The various ways in which electrochromic displays may be protected will be largely described separately below, but methods for combining the various embodiments of the third aspect of the present invention will readily be apparent to those skilled in the art of electro-optic display construction.

Section C1: First Embodiment—Ultra-violet Radiation Seal

A first embodiment of the third aspect of the present invention provides a structure for and method of protecting electrochromic displays against environmental factors by covering the glass substrates of such displays with an ultra-violet filter and a layer of plastic. These additional layers eliminate the light degradation of the redox chromophore which are apparently caused by photocatalytic reactions at the titania film.

FIG. 15 shows an electrochromic display (generally designated 1500) comprising a first glass substrate 1506, a first conductive layer 1508, a nano-structured titania film 1510, a redox chromophore 1512, an electrolyte solution 1520, a plurality of conductive elements 1516, and a second glass substrate 1514, all of which are similar to the corresponding integers previously described with reference to FIGS. 9 and 13. However, the display 1500 further comprises an electrolyte seal 1530, a top UV filter 1532, a bottom UV filter 1534, a top plastic layer 1536, a bottom plastic layer 1538, a plurality of terminal pads 1540, and a plurality of openings 1542. (The terms "top" and "bottom" will be used below solely with reference to the orientation of the display 1500 shown in FIG. 15. As previously explained, electrochromic displays such as the display 1500 are intended to be viewed from the surface carrying the nano-structured titania film, i.e., from below in FIG. 15, so that the "top" surface referred to below might be more accurately described as the "non-viewed" surface of the display and the "bottom" surface as the viewed surface.)

The central section (denoted "A" in FIG. 15) of display 1500 is essentially identical to the corresponding part of the display 400 shown in FIG. 4 and can be formed by the method of FIG. 2.

Top UV filter 1532 and bottom UV filter 1534 are layers of a polymer doped with a commercial UV absorber (for example, Tinuvin®); such absorber doped polymer layers are available commercially. After coating top UV filter 1532 and bottom UV filter 1534 with thin sheets of top plastic layer 1536 and bottom plastic layer 1538, openings 1542 are formed where connections to terminal pads 1540 are needed. In some cases where one surface of the display is not exposed to UV radiation (for example, because that surface is mounted within an opaque enclosed, the UV filter and plastic layer may be omitted; for example, the UV filter 1532 and plastic layer 1536 might be omitted from the display 1500 if the non-viewed surface of the display were not exposed to UV radiation.

During manufacture, the central section "A" is kept in an environment substantially free from UV so as to not expose the titania layer to UV radiation (i.e., display processing after fusing of the titania film is done in a red or yellow light environment). A preferred method of making the electrochromic display 1500 is as follows:

Step 1: Creating UV Filter Material

As already mentioned, the necessary absorber-doped polymer materials are available commercially, or a mixture of the absorber and polymer in solution may be prepared by conventional techniques well known in the art.

Step 2: Applying UV Filter Material to the Top Surface (Optional)

If a solution is being applied, the UV filter material created in Step 1 is spread using for example spray coating, bar coating or spin coating to a final thickness of about 2 sum on second glass substrate 1514 to form top UV filter 1532. If a preformed absorber-doped polymer layer is used, this layer is simply laminated in position, using an adhesive, such a polyester adhesive, if necessary.

Step 3: Applying UV Filter Material to Bottom Surface

If a solution is being applied, the UV filter material created in Step 1 is spread using the same techniques as in Step 2 to a final thickness of about 2 μm on first glass substrate 1506 to form bottom UV filter 1534. If a preformed absorber-doped polymer layer is used, this layer is simply laminated in position, using an adhesive, such a polyester adhesive, if necessary.

Step 4: Applying Protective Plastic Layer to the Top UV Filter Material (Optional)

A thin (2 mm) clear plastic layer is applied (by lamination or roll-pressing) on top UV filter 1532 to form top plastic layer 1536.

Step 5: Applying Protective Plastic Layer to the Bottom UV Filter Material

A thin (2 mm) clear plastic layer is applied (by lamination or roll-pressing) on bottom UV filter 1534 to form bottom plastic layer 1538.

Step 6: Forming Openings through Top Plastic Layer and Top UV Filter Layer (Where Needed)

Portions of top plastic layer 1536 and top UV filter 1532 may be removed (by wet etching or other means) to form openings 1542 where connections to terminal pads 1540 are needed.

Step 7: Forming Openings Through Bottom Plastic Layer and Bottom UV Filter Layer Portions of bottom plastic layer 1538 and bottom UV filter 1534 are removed (by wet etching or other means) to form openings 1542 where connections to terminal pads 1540 are needed. It should, however, be noted that if, as is commonly the case, the conductive layer 1508 is a common electrode extending across the whole display, the necessary connection to this common electrode may conveniently be made at one edge of the display, thereby avoiding any undesirable optical effects due to the formation of openings in the viewed surface of the display 1500.

UV filters 1532 and 1534 shield the electrochromic display 1500 from UV radiation, for example the UV radiation found in sunlight.

The UV filters 1532 and 1534 may, for example, be formed from ethylene vinyl acetate (EVA) or from a polycarbonate (for example, the material known as Lexan®, produced by General Electric) of a thickness of, for example, 1 to 5 mils (25 to 127 μm). A polymethyl methacrylate (PMMA) based layer, typically having a thickness of about 1 to 10 mil (25 to 254 μm) may also be used.

Section C2: Second Embodiment—Moisture Seal

The third aspect of the present invention also provides a structure and method for sealing an electrochromic display from moisture, and a preferred structure for this purpose is shown in FIGS. 16 and 17.

FIG. 16 is a cross-section through an electrochromic display (generally designated 1600) comprising a first glass substrate 1606, a conductive layer 1608, a nano-structured titania film 1610, a redox chromophore 1612, an electrolyte solution 1620, conductive elements 1616, a second glass substrate 1614, an electrolyte seal 1630, and terminal pads 1640, all of which are similar to the corresponding integers of display 1500 described above with reference to FIG. 15, and all of which are included within a central section "A", which is shown in FIG. 16 bounded by a dotted line. However, the display 1600 also comprises a moisture seal 1640.

The central section "A" of the electrochromic display 1600 may be prepared by methods known in the art and already described, for example is method 200 shown in FIG. 2.

Moisture seal 1640 is approximately 2.5 mm in width and equal in thickness to electrolyte seal 1630. The two seals are spaced approximately 2.5 mm apart. Electrolyte seal 1630 is a deposited epoxy resin as described in the prior art and above with reference to FIGS. 3A and 3B.

FIG. 17 is a top plan view, similar to that of FIG. 3B, of part of an assembly used to produce display 1600; FIG. 17 shows the relative positions of the electrolyte seal 1630 and the moisture seal 1640. It will be seen that electrolyte seal 1630 is provided with an electrolyte seal gap 1632, while moisture seal 1640 is provided with a moisture seal gap 1642. These gap 1632 and 1642 are provided for the same purpose as the opening 118 shown in FIG. 3B, namely to allow the display 1600 to be filled with electrolyte solution 1620 through the gap 1632 and 1642.

Moisture seal 1640 is a hydrophobic seal formed from a glass, polymer, or metal. If moisture seal 1640 is made of glass, liquid glass may be applied into the gap between the glass substrates 1606 and 1614 and allowed to cure. The moisture seal 1640 may be formed from a hydrophobic polymer, for example polyethylene, polytetrafluoroethylene, polystyrene, polyvinyl chloride, polyethylene terephthalate, polyisoprene, polypropylene or a polysiloxane. A calcium-based material or other desiccant may be included within the display inside the moisture seal 1640 to scavenge any moisture which ultimately manages to penetrate the seal. Appropriate calcium-based materials and desiccants include calcium carbonate, magnesium sulfate, sodium sulfate, calcium oxide and alumina.

The display 1600 may be manufactured by a modification of the process 200 shown in FIG. 2. The moisture seal 1640 may be deposited on the first glass substrate 1606 before, simultaneously with, or after the electrolyte seal 1630, leaving the gap 1642 in seal 1640; see step 210 of method 200. The electrolyte solution 1620 is then filled under vacuum through moisture seal gap 1642 and electrolyte seal gap 1632 in the same way as in step 212 of method 200, and the electrolyte seal gap 1632 is sealed, as described above with reference to step 214 of method 200, through moisture seal gap 1642, leaving moisture seal gap 1642 open. Finally, moisture seal gap 1642 is sealed using a moisture seal material and a syringe-type applicator.

As already noted, the electrochromic display 1600 may include a calcium-based material or other desiccant as a patch inside the moisture seal 1640 to act as a scavenger to remove water from the electrolyte solution 1620. Although elemental calcium could be used for this purpose, its use is not generally recommended since the elemental form tends to be pyrophoric.

Section C3: Third Embodiment—Oxygen and Moisture Seal

A third embodiment of the third aspect of the present invention provides a structure for and method of sealing an electrochromic display from both oxygen and moisture. An electrochromic display sealed against moisture has been described above. A similar structure may be used to seal against both oxygen and moisture, except that the oxygen seal is a third sealing layer, along with the moisture and electrolyte seals.

The three seals (electrolyte, moisture and oxygen) can be in any order, and in some case a single material may serve as a seal against any two or all three materials.

Section C4: Fourth Embodiment—Coated Titania

Reference has already been made above, during the discussion of the second aspect of the present invention, to the use of nano-structured titania films in which the titania is coated with silica and/or alumina. Although the purpose for such coating of the titania in the second aspect of the present invention is to reduce the sintering temperature of the titania, such coating of the titania has the additional advantage of eliminating, or at least reducing, the photoactive titania surface and replacing it with a substantially non-photoactive silica or alumina surface (the surface could of course comprise a mixture of these two materials). This coating thus reduces or eliminates the degradation of the redox chromophore from ultra-violet radiation due to the photocatalytic reaction of the nano-structured titania film.

The coated titania may be prepared by any of the methods described in Section B4 above.

Section C5: Fifth Embodiment—Electrostatic Shield

A fifth embodiment of the third aspect of the present invention provides protection of an electrochromic display against electrostatic currents. The electrostatic protection means is formed from a bi-directional diode or unidirectional diode with controlled reverse breakdown characteristics. One prior art method, described in U.S. Pat. No. 5,930,607, "Method to prevent static destruction of an active element comprised in a liquid crystal display device," uses an electrostatic protection element composed of a MOS transistor connected between the electrode for connecting the external terminal, and the joint electric potential line. Each of the drive lines connected to terminal pads are tied to ground through the bi-directional diode or unidirectional diode.

Section C6: Sixth Embodiment—Glass Posts or Beads

A sixth embodiment of the third aspect of the present invention relates to reducing cell-to-cell field effect and eliminating high fields by developing glass posts on the glass substrates.

FIG. 18 is a schematic section, generally similar to that of FIG. 16, though an electrochromic display (generally designated 1800) comprising a first glass substrate 1806, a conductive layer 1808, a nano-structured titania film 1810, a redox chromophore 1812, an electrolyte solution 1820, conductive elements 1816, a second glass substrate 1814, an electrolyte seal 1830, and terminal pads 1840, all of which are substantially identical to the corresponding integers shown in FIG. 16. However, the electrochromic display 1800 further comprises a plurality of glass posts 1850, only one of which is shown in FIG. 18. The glass posts 1850 are glued to the second glass substrate 1814, and are provided in regions that enclose each cell (as defined by the conductive elements 1816). The glass posts 1850 can alternatively be etched from the second glass substrate 1814 if the initial second glass substrate 1814 is made thicker. The formation of the posts 1850 is done before any of the prior art processes are used to form the second glass substrate 1814.

An alternative method of reducing cell-to-cell field effect is to disperse glass beads into electrolyte solution 1820 to prevent the electrochromic display 1800 from collapsing. The "beads" used need not be spherical and may, for example, have any of the forms described in U.S. Pat. No. 6,392,786.

The present invention may make use of any of the electrolytes mentioned in the aforementioned U.S. Pat. No. 6,301,038, WO 01/27690 and Wood article, as already discussed above.

Section D: Integrating and Controlling an Electro-optic Display

As already mentioned, the fourth aspect of the present invention relates to systems and methods of operating an electro-optic display. In contrast to the first three aspects of the present invention, which are confined to electrochromic displays, the fourth aspect is not confined to such displays, but can be applied to any of the types of electro-optic displays discussed in the introductory part of this application.

However, perhaps the most complex type of electro-optic display to drive is an electrochromic display, such as the electrochromic displays based upon nano-structured titania films previously described. Such electrochromic displays are affected by factors such as ion transport efficiency and variable diodic behavior of the nano-structured titania film, which are not present in other types of electro-optic displays.

Accordingly, hereinafter a preferred embodiment of the invention for controlling an electrochromic display will first be described, and thereafter application of the same general principles to other types of electro-optic displays will be discussed.

Thus, the fourth aspect of this invention provides a current drive means to drive an electrochromic cell of a display comprising multiple cells. Because of the electrical model of the electro-chromophore cell, each cell must be driven based upon the behaviors of at least the: (1) steady-state response of the cell; (2) time-varying response of the cell; (3) interaction with adjacent cells; (4) light reflectivity versus ion transport curve for the redox chromophore of the cell; (5) ion transport efficiency; (6) variable diodic behavior of the nano-structured titania film of the cell; (7) interaction of optical feedback of the cell; (8) electrolyte potential changeover of the cell; (9) changes over operating life of the electrolyte solution performance of the cell; (10) changes over operating life of the redox chromophore of the cell; (11) effects of ambient and operating temperatures on cell performance; and (12) effects of ambient light on display quality. In order to include all these behaviors, a means to drive each cell based upon an algorithm for each of these behaviors is required. Many of these behaviors are dependent on environmental factors, such as ambient light, electrolyte potential, temperature, etc. Because of this dependency, these environmental factors must be monitored and the algorithms need to be adjusted by these monitored results. Thus, the basic system not only includes the means to direct drive each cell by a current driver, but also a processor for translating the required image input data to drive the display. The processor may use algorithms stored in memory and sensor data sensed from a sensor to dynamically drive each of the current drives for each cell.

FIG. 19 shows a block diagram of an electrochromic display system (generally designated 1900) consisting of a plurality of nano-crystalline electrochromic display cells 1902 in a display area 1904, a plurality of current mode drivers (CMD's) 1906, a plurality of drive currents 1908, a memory 1910, a processing unit 1912, a data/address bus 1914, a device interface 1916, a plurality of analog-to-digital converters (A/D's) 1918, an electrochromophore sensor 1920, an electrolyte sensor 1922, a temperature sensor 1924, and a light sensor 1926.

Processing unit 1912 is a semiconductor device, such as a microprocessor or micro controller, well known in the art. It is electrically connected to current mode drivers 1906, memory 1910, and A/D's 1918 via data/address bus 1914. Communication of address, data, and command information is transferred using standard digital electronic interface techniques. Processing unit 1912 is also electrically connected to device interface 1916. Device interface 1916 provides the electrical and protocol interface between electrochromic display system 1900 and the electronic device it services, such as a computer, cell phone, or personal digital assistant (PDA).

A/D's 1918 are semiconductor analog-to-digital converters of a type known in the art, and are electrically connected to electrochromophore sensor 1920, electrolyte sensor 1922, temperature sensor 1924, and light sensor 1926.

Current mode drivers 1906 are electrically connected to nano-crystalline electrochromic display cells 1902 so that one CMD 1906 is connected to one and only one nano-crystalline electrochromic display cell 1902. CMD's 1906 source or sink drive currents 1908. (It will be appreciated by those skilled in the art of driving displays that the arrangement shown in FIG. 19 can readily be adapted for active matrix driving of an electrochromic display. In such an active matrix display, the current mode drivers are connected to source lines and select drivers are connected to select lines, and by sequential activation of the select lines, voltages or currents can be applied to the appropriate pixels from the source lines.)

Memory 1910 is a non-volatile semiconductor memory of a type known in the art (ROM, EPROM, EEPROM, NVRAM) and sized according to the application requirement. Both data and program executable images reside in memory 1910.

In operation, electrochromic display system 1900 functions to interpret commands from the electronic device it is servicing, to determine the desired display, to assess the state of the display, to apply optimization rules based on that state, and to drive each nano-crystalline electrochromic display cell 1902 with the appropriate electrical current to effect the new display image.

Basic Process

FIG. 20 shows a flow chart of a method (generally designated 2000) for driving electrochromic display system 1900, this method 2000 including the following steps:

Step 2010: Receiving Display Data from Device

In this step, electrochromic display system 1900 receives digital coded electronic data from the electronic device it is servicing via device interface 1916. The received data set defines the next required display image on a cell-by-cell basis, as well as the state of each cell (On/Off/Certain Grey or color scale). Device interface 1916 performs the algorithms to translate the display image to cell-by-cell data before this data is transferred to processing unit 1912.

Step 2020: Interpreting Display Data

In this step, device interface 1916 performs a hard-coded algorithm to translate the data set received from the serviced device into the native data format of processing unit 1912.

Step 2030: Creating Virtual Cell Map in Memory

In this step, processing unit 1912 transmits data and command signals via data/address bus 1914, executes code stored in memory 1910, interprets the data received from device interface 1916 and creates a virtual cell map in memory 1910. This map is a row/column matrix with the desired next state for each nano-crystalline electrochromic display cell 1902 in electrochromic display system 1900.

Step 2040: Assessing State of Display

In this step, processing unit 1912 transmits data and command signals via data/address bus 1914, executes code stored in memory 1910, and assesses the state of electrochromic display system 1900. This assessment includes the previously driven state of each nano-crystalline electrochromic display cell 1902 and several environmental variables. This step is further detailed in FIG. 21.

Step 2050: Applying State-driven and Static Rules to each Cell

In this step, processing unit 1912 transmits data and command signals via data/address bus 1914, executes code stored in memory 1910, and applies both state-driven and static rules for determining what electrical current to apply to each nano-crystalline electrochromic display cell 1902 to achieve the desired display image. The resulting current level values to be applied are stored in memory 1910. This step is further detailed in FIG. 22.

Step 2060: Establishing Current Mode Driver for each Cell

In this step, processing unit 1912 transmits data and command signals via data/address bus 1914, executes code stored in memory 1910, and translates the current level values to be applied to each nano-crystalline electrochromic display cell 1902 into digital data and control signals for interpretation by CMD's 1906.

Step 2070: Setting Current Drive for each Cell

In this step, processing unit 1912 transmits data and command signals via data/address bus 1914, executes code stored in memory 1910, and transmits data and command signals via data/address bus 1914 to CMD's 1906. The CMD's 1906 interpret the data and command string, and source or sink the required drive currents 1908.

Step 2080: Recording Cell State in Memory

In this step, processing unit 1912 transmits data and command signals via data/address bus 1914, executes code stored in memory 1910, and writes the new cell states for all nano-crystalline electrochromic display cells 1902 into memory 1910.

Process for Sensing and Adapting

The electrochromic display system 1900 of the present invention is designed to adapt to changes in the state of the display in order to optimize the display properties. The first step in this adaptation is the accurate determination of the state of various aspects of the display. FIG. 21 shows a flow chart of a method (generally designated 2100) for assessing the state of the display, including the following steps:

Step 2110: Determining Previous Set State

In this step, processing unit 1912 transmits data and command signals via data/address bus 1914, executes code stored in memory 1910, and determines the previously set state of each nano-crystalline electrochromic display cell 1902. The previous set state for each cell is stored in a specified table in memory 1910. Note that during initial power-up, all cells are be forced to a known state, either colored or bleached.

Step 2120: Determining State of Electrolyte

In this step, processing unit 1912 transmits data and command signals via data/address bus 1914, executes code stored in memory 1910, and determines the operating state of the electrolyte solution. Processing unit 1912 transmits data and command signals via data/address bus 1914 to A/D's 1918, which interpret the data stream, select the input channel electrically connected to electrolyte sensor 1922, sample the analog signal present on the input channel, and convert the magnitude of the signal to the digital domain. Upon completion of the conversion, A/D's 1918 place the resulting digital data on data/address bus 1914. Processing unit 1912 reads the data from A/D's 1918 and stores this data in memory 1910.

Step 2130: Determining State of Electrochromophore

In this step, processing unit 1912 transmits data and command signals via data/address bus 1914, executes code stored in memory 1910, and determines the operating state of the redox chromophore. Processing unit 1912 transmits data and command signals via data/address bus 1914 to A/D's 1918, which interpret the data stream, select the input channel electrically connected to electrochromophore sensor 1920, sample the analog signal present on the input channel, and convert the magnitude of the signal to the digital domain. Upon completion of the conversion, A/D's 1918 place the resulting digital data on data/address bus 1914. Processing unit 1912 reads the data from A/D's 1918 and stores it in memory 1910.

Step 2140: Determining Display Temperature

In this step, processing unit 1912 transmits data and command signals via data/address bus 1914, executes code stored in memory 1910, and determines the display temperature. Processing unit 1912 transmits data and command signals via data/address bus 1914 to A/D's 1918, which interpret the data stream, select the input channel electrically connected to temperature sensor 1924, sample the analog signal present on the input channel, and convert the magnitude of the signal to the digital domain. Upon completion of the conversion, A/D's 1918 place the resulting digital data on data/address bus 1914. Processing unit 1912 reads the data from A/D's 1918 and stores it in memory 1910.

Step 2150: Determining Ambient Light Level

In this step, processing unit 1912 transmits data and command signals via data/address bus 1914, executes code stored in memory 1910, and determines the ambient light level. Processing unit 1912 transmits data and command signals via data/address bus 1914 to A/D's 1918, which interpret the data stream, select the input channel electrically connected to light sensor 1926, sample the analog signal present on the input channel, and convert the magnitude of the signal to the digital domain. Upon completion of the conversion, A/D's 1918 place the resulting digital data on data/address bus 1914. Processing unit 1912 reads the data from A/D's 1918 and stores it in memory 1910.

Process for Modifying Display Based Upon Changes Sensed

Once the state of the display has been thus determined, a series of algorithms are applied to the cell state definitions in the previously created virtual cell map in memory. Each rule modifies the drive requirements necessary for accurately displaying the image. FIG. 22 is a flow chart of a method (generally designated 2200) for applying these algorithms. The flow chart shown in FIG. 22 is for a simple case where interaction between different display parameters is not directly taken into account. However, those skilled in the art will realize that a more complex multiple interaction state-based flow can be readily achieved with modern programmatic control. Method 2200 includes the following steps:

Step 2210: Applying Steady-state Circuit Rule

Figure 5:
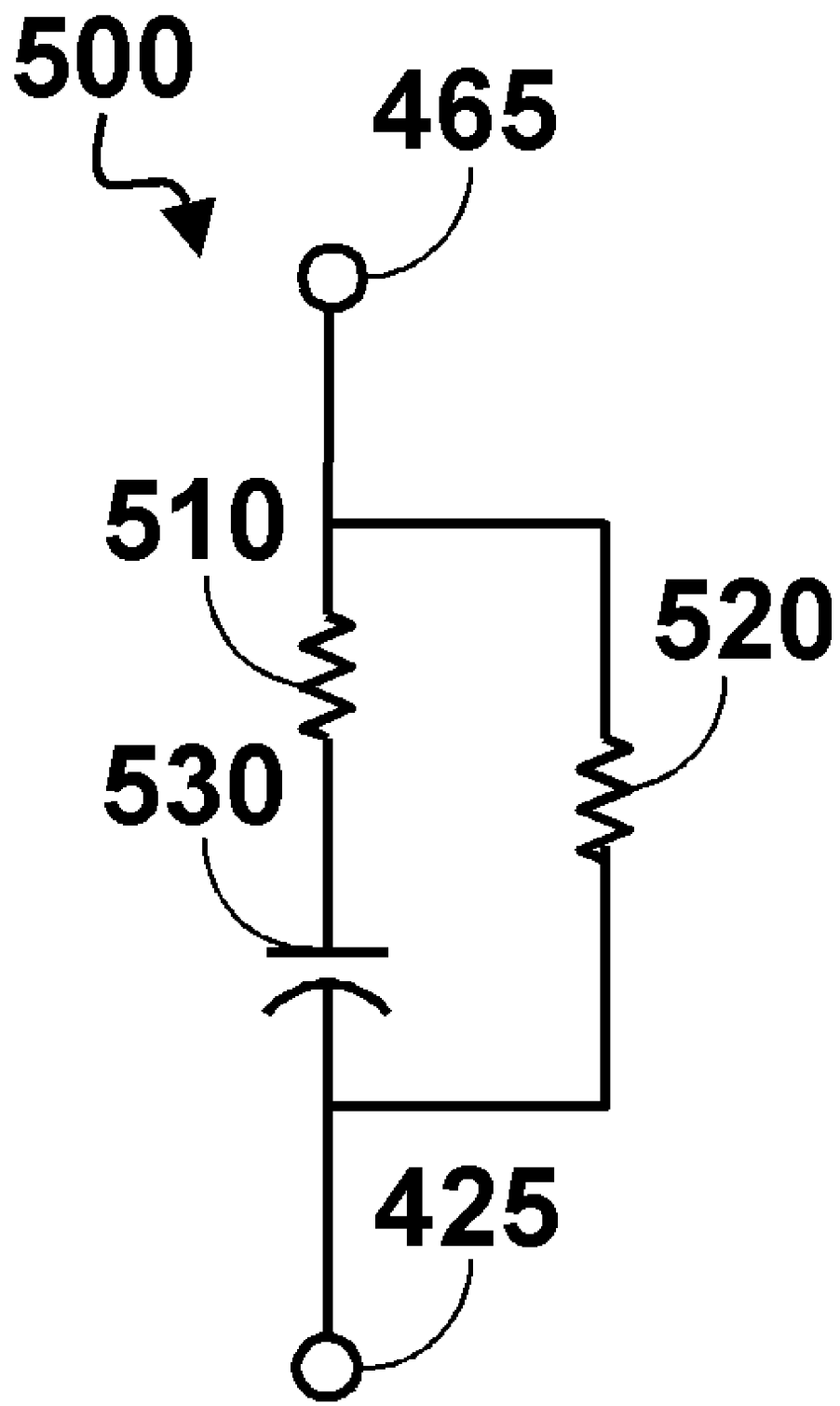
FIG. 5 shows a simplified electrical circuit model of the cell shown in FIG. 4.

In this step, processing unit 1912 transmits data and command signals via data/address bus 1914, executes code stored in memory 1910, and uses the previously determined previous driven cell state, a look-up table with values for steady-state behavior of electrical circuit model 500 (FIG. 5), and state change conversion models for black and white (see the Table below) to algorithmically determine the first order of drive current for each nano-crystalline electrochromic display cell 1902 in display 1900. The look-up table for steady-state behavior of electrical circuit model 500 may be determined for a class of displays or during a one-time calibration during manufacturing.

TABLE

| | Black/white data | |
|---|---|---|
| Previous State | Final State Colored | Bleached |
| Colored | 0 | +1 |
| Bleached | −1 | 0 |

Step 2220: Applying Dynamic Circuit Rule

In this step, processing unit 1912 transmits data and command signals via data/address bus 1914, executes code stored in memory 1910, and uses a look-up table with values for dynamic behavior of electrical circuit model 500 to determine the dynamic compensation of drive current 1908 for each nano-crystalline electrochromic display cell 1902. The look-up table for the dynamic behavior of electrical circuit model 500 may be determined for a class of displays or during a one-time calibration during manufacturing.

Step 2230: Applying Adjacent Cell Interaction Rule

In this step, processing unit 1912 transmits data and command signals via data/address bus 1914, executes code stored in memory 1910, and uses a look-up table with values for adjacent cell interference behavior of electrical circuit model 500 to determine the adjacent cell interference compensation of drive current for each nano-crystalline electrochromic display cell 1902. The look-up table for the adjacent cell interference behavior of electrical circuit model 500 may be determined for a class of displays or during a one-time calibration during manufacturing.

Step 2240: Applying Ion Transfer Efficiency Compensation Rule

In this step, processing unit 1912 transmits data and command signals via data/address bus 1914, executes code stored in memory 1910, and uses a look-up table with values for ion transfer efficiency behavior of nano-crystalline electrochromic display cells 1912 to determine the adjacent cell interference compensation of drive current for each cell. The look-up table for the ion transfer efficiency behavior of nano-crystalline electrochromic display cells 1902 may be determined for a class of displays or during a one-time calibration during manufacturing.

Step 2250: Applying Titania Diodic Behavior Compensation Rule

In this step, processing unit 1912 transmits data and command signals via data/address bus 1914, executes code stored in memory 1910, and uses a look-up table with values for the diodic behavior of nano-structured titania film 430 (FIG. 4) to determine the compensation of drive current for each cell. The look-up table for the nano-structured titania film 430 behavior may be determined for a class of displays or during a one-time calibration during manufacturing.

Step 2260: Applying Optical Feedback Rule

In this step, processing unit 1912 transmits data and command signals via data/address bus 1914, executes code stored in memory 1910, and uses a look-up table with values for the optical feedback of electrochromic display system 1900 to determine the compensation of drive current 1908 for each cell 1902. The look-up table for the optical feedback behavior may be determined for a class of displays, during a one-time calibration during manufacturing, or by real-time measurement.

Step 2270: Applying Electrolyte Aging Compensation Rule

In this step, processing unit 1912 executes code stored in memory 1910 and uses a look-up table with values for the operating state of electrolyte solution 450 (FIG. 4) to determine the compensation of drive current for each cell 1902. The look-up table for the operating state of electrolyte solution 450 is created by real-time measurement (step 2120 of method 2100, FIG. 21).

Step 2280: Applying Chromophore Aging Compensation Rule

In this step, processing unit 1912 transmits data and command signals via data/address bus 1914, executes code stored in memory 1910 and uses a look-up table with values for the operating state of redox chromophore 440 (FIG. 4) to determine the compensation of drive current for each cell 1902. The look-up table for the operating state of redox chromophore 440 is created by real-time measurement (step 2130 of method 2100, FIG. 21).

Step 2290: Applying Temperature Compensation Rule

In this step, processing unit 1912 transmits data and command signals via data/address bus 1914, executes code stored in memory 1910, and uses a look-up table with values for temperature to determine the compensation of drive current for each cell 1902. The look-up table for temperature is created by real-time measurement (step 2140 of method 2100, FIG. 21).

Step 2295: Applying Ambient Light Compensation Rule

In this step, processing unit 1912 transmits data and command signals via data/address bus 1914, executes code stored in memory 1910, and uses a look-up table with values for ambient light to determine the compensation of drive current for each cell 1902. The look-up table for the ambient light is created by real-time measurement (step 2150 of method 2100, FIG. 21).

The steps in methods 2100 and 2200 are not essential to the fundamental method of driving electrochromic display system 1900, and any of these steps can be added or eliminated.

Those skilled in the art of driving electro-optic displays will appreciate that although current mode drivers 1906 of FIG. 19 are described as a means to drive each nano-crystalline electrochromic display cell 1902, a voltage driver could be used instead. In this case, the hard-coded algorithms in memory 1910, as well as the means to sense and adapt data for each cell, would be much more complicated because of the nature of the electrolytic-based cell. The cell has electrical circuit model 500 of FIG. 5 with a capacitor, which in a small signal sense has time sensitive and previous state sensitive capacitance. Thus, the algorithms to drive a voltage drive system would be far more complex.

Non-electrochromic Media and Displays

As will be apparent to those skilled in technology of electro-optic displays, many of the techniques described above for controlling electrochromic media and displays, such as the provisions of temperature sensors and timers, can readily be applied to other types of electro-optic displays.

For example, in an encapsulated electrophoretic display, changes in the performance of the encapsulated electrophoretic medium caused by changes in environmental parameters or aging could be compensated by changing the drive pulse length. Under any given set of environmental conditions, the waveform can be optimized to provide a balance between over/under driving and self-erasing. The adaptation can be done by monitoring any appropriate parameter of the electrophoretic medium or its environment and using a predetermined formula or look up table to change the waveforms of the drive pulses. The same type of monitoring could also be used to provide an output signal which could serve as an input to a circuit or algorithm to determine the proper drive waveform, or these methods could be used in combination.

For example, as already indicated it is known from laboratory experiments that the optimum impulse (which for present purposes is defined as the integral of the applied voltage with respect to time, although the integral of current through the electrophoretic medium with respect to time could also be used) to be applied to an encapsulated electrophoretic medium is a function of temperature. A thermistor, digital thermometer or other temperature sensor could be used to measure the temperature of electrophoretic medium, or the environment immediately adjacent thereto, and the impulse could be adjusted through an analogue or digital feedback circuit. A humidity sensor could also be used in cases where the performance of the electrophoretic medium was substantially affected by changes in humidity.

Also, the current transient for any convenient unit of the display (for example, a single pixel, a row or column of a matrix display or the whole display) resulting from a single switching operation could be measured and used to control the waveform. Alternatively, the current passing through the electrophoretic medium in some reference state (for example, during a refresh pulse used to counteract drift of the optical state of the display from its original value) could be measured, thereby providing information about the movement of the electrophoretic particles within the electrophoretic medium and/or about the capsule wall, binder or other components of the electrophoretic medium. Computations based upon the current/time curve could then be used to calculate the appropriate drive waveform. A combination of one or more of the foregoing approaches could be used to vary the drive waveform and compensate for the effects of temperature upon the electrophoretic medium; such changes include, but are not limited to viscosity changes of the suspending fluid in which the electrophoretic particles are suspended.

Since temperature is probably the most important environmental variable affecting most encapsulated electrophoretic displays, temperature compensation of such displays will now be considered in more detail, it being understood that the temperature compensation techniques described below may be useful with electro-optic media other than encapsulated electrophoretic media.

The two simplest techniques for adjustment of drive waveforms in response to variations in temperature are temperature-dependent voltage variation and temperature-dependent duration variation. These methods can be used separately or in combination to improve encapsulated electrophoretic medium performance. In temperature-dependent voltage variation, an electronic circuit is required to vary the voltage output based on temperature of the environment. The voltage should vary inversely with temperature (i.e. as temperature goes up, voltage output goes down) for use with an encapsulated electrophoretic display. Similarly, in temperature-dependent duration variation, an electronic circuit is required to vary the drive pulse duration based on temperature of the environment. The duration should vary inversely with temperature (i.e. as temperature goes up, the drive pulse duration goes down) for use with an encapsulated electrophoretic display.

FIGS. 23 and 24 of the accompanying drawings illustrate circuits used in a preferred embodiment of a temperature-compensated voltage supply for driving encapsulated electrophoretic displays; FIG. 23 shows a DC-DC voltage converter circuit ("voltage booster") while FIG. 24 shows a voltage feedback circuit. The DC-DC converter circuit in FIG. 23 charges up the capacitor shown therein to a target voltage while being monitored by the voltage feedback circuit of FIG. 24. The voltage feedback circuit of FIG. 24 checks this target voltage by comparing a monitor voltage, determined by the resistor voltage divider, to a reference voltage, determined by the voltage divider circuit consisting of a resistor and a diode. When the monitor voltage exceeds the reference voltage, the target voltage is reached and the PWM feed to the voltage booster circuit of FIG. 23 is turned off. When the monitor voltage dips below the reference voltage, the voltage booster is turned back on to raise the monitor voltage again.

The diode/resistor voltage divider shown in FIG. 24 is the crucial part of this temperature-compensated voltage supply. The diode has a resistivity characteristic that is temperature-dependent, i.e., its resistivity varies inversely with temperature. In other words, the diode becomes more conductive as temperature increases. In the resistor divider circuit, this temperature variation of the diode in turn causes the reference voltage to fall as temperature increases. The voltage booster circuit of FIG. 23 will accordingly be turned off at lower target voltages, effectively producing lower high voltage outputs at higher temperatures.

As already indicated, an encapsulated electrophoretic medium tends to degrade during use, and the rate of such degradation increases with the amount of electrical current passed through the medium. At higher temperatures, the medium becomes more conductive and therefore would see more current if the drive pulse voltage and duration were maintained constant at all temperatures. Reducing the drive pulse voltage with temperature using the circuitry of FIGS. 23 and 24 reduces the rate of degradation of the medium at higher temperatures and thus extends the working lifetime of the medium.

The circuitry shown in FIGS. 23 and 24 also lowers the variation in the optical response of an encapsulated electrophoretic medium with variation in temperature. The circuitry drives the medium at a higher voltage and/or with a longer voltage pulse at lower temperatures in order to saturate the medium, while driving the medium at a lower voltage and/or shorter voltage pulse at higher temperatures in order to prevent over-saturation of the medium. The circuitry also has the potential to make the switching response time curve of the encapsulated electrophoretic medium more uniform despite variations in temperature.

The foregoing advantages are achieved simply by modest modifications of the drive circuitry needed to drive the electrophoretic medium to enable this circuitry to monitor the environmental conditions to which the medium is exposed and adapt the drive waveform used. No modification of the medium itself is required, and this is advantageous since modification of a relatively complex encapsulated electrophoretic medium to reduce the variation of its electro-optic properties with temperature is inherently more difficulty than modification of drive circuitry.

The present invention allows electro-optic media to operate under a wider range of environmental conditions than would be possible using a fixed drive waveform. By incorporating into the display a timer which measures the period for which the medium has been operated, the present invention also allows for "aging" of the electro-optic medium which can have an undesirable impact on the performance of the medium.

Numerous changes and modifications can be made in the preferred embodiments of the present invention already described without departing from the spirit and skill of the invention. Accordingly, the foregoing description is to be construed in an illustrative and not in a limitative sense.

What is claimed is:

1. A method of operating an electro-optic display, the display comprising an electro-optic medium; and at least one electrode arranged to apply an electric field to the electro-optic medium, the method comprising:
   applying a first driving pulse to the electrode;
   measuring the current passing through the electro-optic medium as a result of the application of the first driving pulse; and
   applying a second driving pulse to the electrode, the second driving pulse being controlled by the measured current.

2. A method according to claim 1 further comprising measuring the temperature of the display and controlling the second driving pulse dependent upon the measured temperature and the measured current.

3. A method according to claim 1 further comprising measuring the ambient light level of the display and controlling the second driving pulse dependent upon the measured ambient light level and the measured current.

4. A method according to claim 1 further comprising controlling the second driving pulse dependent upon the age of the electro-optic medium and the measured current.

5. A method according to claim 1 wherein the electro-optic medium is an electrophoretic medium comprising a suspending fluid, and a plurality of electrically charged particles suspended in the suspending fluid and capable of moving therethrough on application of an electric field to the suspending fluid.

6. A method according to claim 5 wherein the suspending fluid and the plurality of electrically charged particles are retained within a plurality of capsules.

7. A method according to claim 5 wherein the suspending fluid and the plurality of electrically charged particles are present as a plurality of discrete droplets and a continuous phase of polymeric material surrounds the droplets.

8. A method according to claim 5 wherein the suspending fluid and the plurality of electrically charged particles are retained within a plurality of cavities formed in a carrier medium.

9. A method according to claim 1 wherein the electro-optic medium is a rotating bichromal member medium or an electrochromic medium.

* * * * *